US012684555B2

(12) United States Patent
Kumar et al.

(10) Patent No.: US 12,684,555 B2
(45) Date of Patent: Jul. 14, 2026

(54) OPTIMIZED SUBFRAME BLANKING FOR DUAL SIM DUAL ACTIVE

(71) Applicant: QUALCOMM Incorporated, San Diego, CA (US)

(72) Inventors: Ravinder Kumar, San Diego, CA (US); Abbas Termos, San Diego, CA (US); Pak Yin Tam, San Jose, CA (US); Qiang Shen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 741 days.

(21) Appl. No.: 18/174,533

(22) Filed: Feb. 24, 2023

(65) Prior Publication Data

US 2024/0292401 A1 Aug. 29, 2024

(51) Int. Cl.
*H04W 72/12* (2023.01)
*H04W 72/543* (2023.01)
*H04W 72/566* (2023.01)

(52) U.S. Cl.
CPC ......... *H04W 72/12* (2013.01); *H04W 72/543* (2023.01); *H04W 72/566* (2023.01)

(58) Field of Classification Search
CPC .. H04W 72/12; H04W 72/543; H04W 72/566
See application file for complete search history.

(56) References Cited

U.S. PATENT DOCUMENTS

| | | | | |
|---|---|---|---|---|
| 12,483,373 B2 * | 11/2025 | Nayeb Nazar | ........ | H04L 1/1692 |
| 2017/0331577 A1 * | 11/2017 | Parkvall | ............... | H04B 7/0452 |

| | | | | |
|---|---|---|---|---|
| 2017/0331670 A1 * | 11/2017 | Parkvall | .............. | H04L 41/0233 |
| 2019/0075438 A1 * | 3/2019 | Kuo | ......................... | H04L 69/22 |
| 2019/0320396 A1 | 10/2019 | Bagheri et al. | | |
| 2019/0394822 A1 | 12/2019 | Hosseini et al. | | |
| 2020/0196343 A1 * | 6/2020 | Marinier | .............. | H04L 5/0053 |
| 2021/0058219 A1 * | 2/2021 | Kimura | ..................... | H04L 5/14 |
| 2021/0226836 A1 * | 7/2021 | Sahin | ...................... | H04W 4/70 |

(Continued)

FOREIGN PATENT DOCUMENTS

WO 2016122773 A1 8/2016

OTHER PUBLICATIONS

International Search Report and Written Opinion—PCT/US2024/012714—ISA/EPO—Jul. 16, 2024.

(Continued)

*Primary Examiner* — Ajay Cattungal
(74) *Attorney, Agent, or Firm* — Procopio, Cory, Hargreaves & Savitch LLP

(57) ABSTRACT

The apparatus in some aspects may be a wireless device configured to operate a first transceiver in a first connected mode with a first radio access network (RAN) and a second transceiver in a second connected mode with a second RAN. The apparatus may further be configured to transmit a first communication via the first transceiver and obtain, based on a second communication via the second transceiver, an indication of a cancellation of one or more symbols for the first communication via the first transceiver. The apparatus may also be configured to refrain from transmitting, based on the indication, a remaining portion of the first communication via a set of symbols including the one or more symbols.

26 Claims, 13 Drawing Sheets

(56) References Cited

U.S. PATENT DOCUMENTS

| | | | |
|---|---|---|---|
| 2022/0070836 A1* | 3/2022 | Balasubramanian ... | H02J 50/20 |
| 2022/0132497 A1* | 4/2022 | Nyeb Nazar ......... | H04L 5/0055 |
| 2023/0050663 A1* | 2/2023 | Lou ........................... | H04L 5/14 |
| 2024/0372661 A1* | 11/2024 | Park ...................... | H04L 5/0044 |
| 2025/0024436 A1* | 1/2025 | Zhang ...................... | H04L 5/14 |
| 2025/0294565 A1* | 9/2025 | Huang ................. | H04L 1/1822 |

OTHER PUBLICATIONS

Partial International Search Report—PCT/US2024/012714—ISA/
EPO—May 23, 2024.

* cited by examiner of Symbols Canceled (N)

| N \ MCS | 12 | 14 | 16 | 18 | 20 | 22 | 24 | 26 | 28 |
|---|---|---|---|---|---|---|---|---|---|
| 0 | 3.6 | 3.9 | 4.1 | 4.8 | 5.8 | 4.8 | 5.8 | 5.8 | 7.7 |
| 1 | 2.6 | 2.9 | 3.1 | 3.8 | 4.8 | 3.8 | 4.8 | 4.8 | 5.7 |
| 2 | 2.6 | 1.9 | 2.1 | 2.8 | 3.8 | 2.8 | 3.8 | 3.7 | 3.7 |
| 3 | 1.6 | 1.9 | 2.1 | 1.8 | 1.8 | 1.8 | 2.8 | 1.8 | N/A |
| 4 | 1.6 | 0.9 | 1.1 | 0.8 | 0.8 | N/A | N/A | N/A | N/A |
| 5 | 0.6 | 0.9 | 1.1 | 0.8 | -1.2 | N/A | N/A | N/A | N/A |
| 6 | 0.6 | -0.1 | -0.9 | -1.2 | -10.2 | N/A | N/A | N/A | N/A |
| 7 | -0.4 | -1.1 | -2.9 | -8.2 | N/A | N/A | N/A | N/A | N/A |
| 8 | -0.4 | -2.1 | -6.9 | N/A | N/A | N/A | N/A | N/A | N/A |
| 9 | -1.4 | -5.1 | N/A | N/A | N/A | N/A | N/A | N/A | N/A |
| 10 | -3.4 | -8.1 | N/A | N/A | N/A | N/A | N/A | N/A | N/A |
| 11 | N/A | N/A | N/A | N/A | N/A | N/A | N/A | N/A | N/A |

MCS

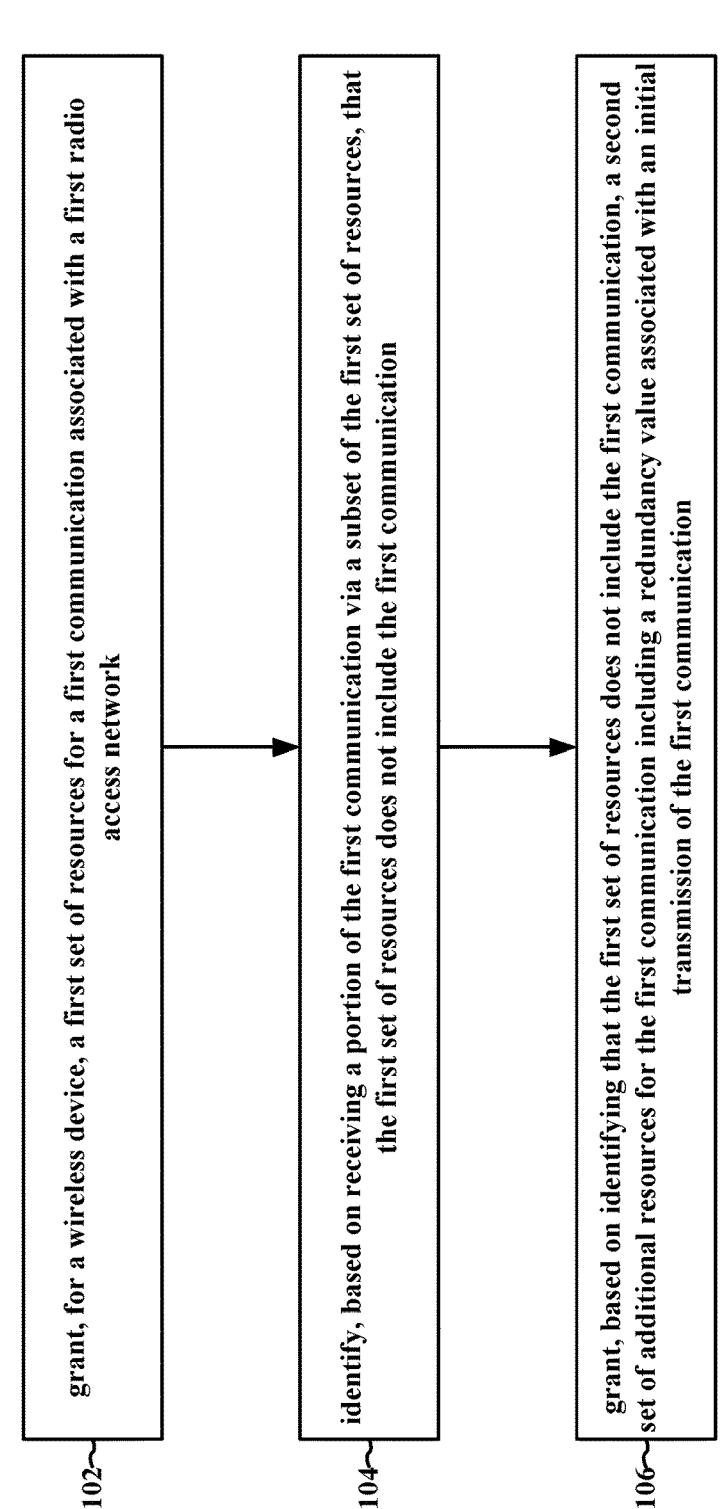

1102　grant, for a wireless device, a first set of resources for a first communication associated with a first radio access network 1104　identify, based on receiving a portion of the first communication via a subset of the first set of resources, that the first set of resources does not include the first communication 1106　grant, based on identifying that the first set of resources does not include the first communication, a second set of additional resources for the first communication including a redundancy value associated with an initial transmission of the first communication

OPTIMIZED SUBFRAME BLANKING FOR DUAL SIM DUAL ACTIVE

TECHNICAL FIELD

The present disclosure relates generally to communication systems, and more particularly, to dual sim dual active (DSDA) wireless devices.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus in some aspects may be a wireless device configured to operate a first transceiver in a first connected mode with a first radio access network (RAN) and a second transceiver in a second connected mode with a second RAN. The apparatus may further be configured to initiate a transmission of a first communication via the first transceiver and obtain, based on a second communication via the second transceiver, an indication of a cancellation of a set of symbols for the first communication via the first transceiver. The apparatus may also be configured to refrain from transmitting, based on the indication, a remaining portion of the first communication via the set of symbols, where the set of symbols includes one or more symbols that at least partially overlap with the second communication.

In an aspect of the disclosure, a method, a computer-readable medium, and an apparatus are provided. The apparatus in some aspects may be configured to grant, for a wireless device, a first set of resources for a first communication associated with a first RAN. The apparatus may further be configured to identify, based on receiving a portion of the first communication via a subset of the first set of resources, that the first set of resources does not include the first communication and to grant, based on identifying that the first set of resources does not include the first communication, a second set of additional resources for the first communication including a redundancy value associated with an initial transmission of the first communication.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7 is a chart illustrating a measure of decodability of a retransmission with no blanking following a transmission with a number, N, of blanked symbols for a given modulation and coding scheme (MCS) in accordance with some aspects of the disclosure.

FIG. 11 is a flowchart of a method of wireless communication.

DETAILED DESCRIPTION

Figure 1:
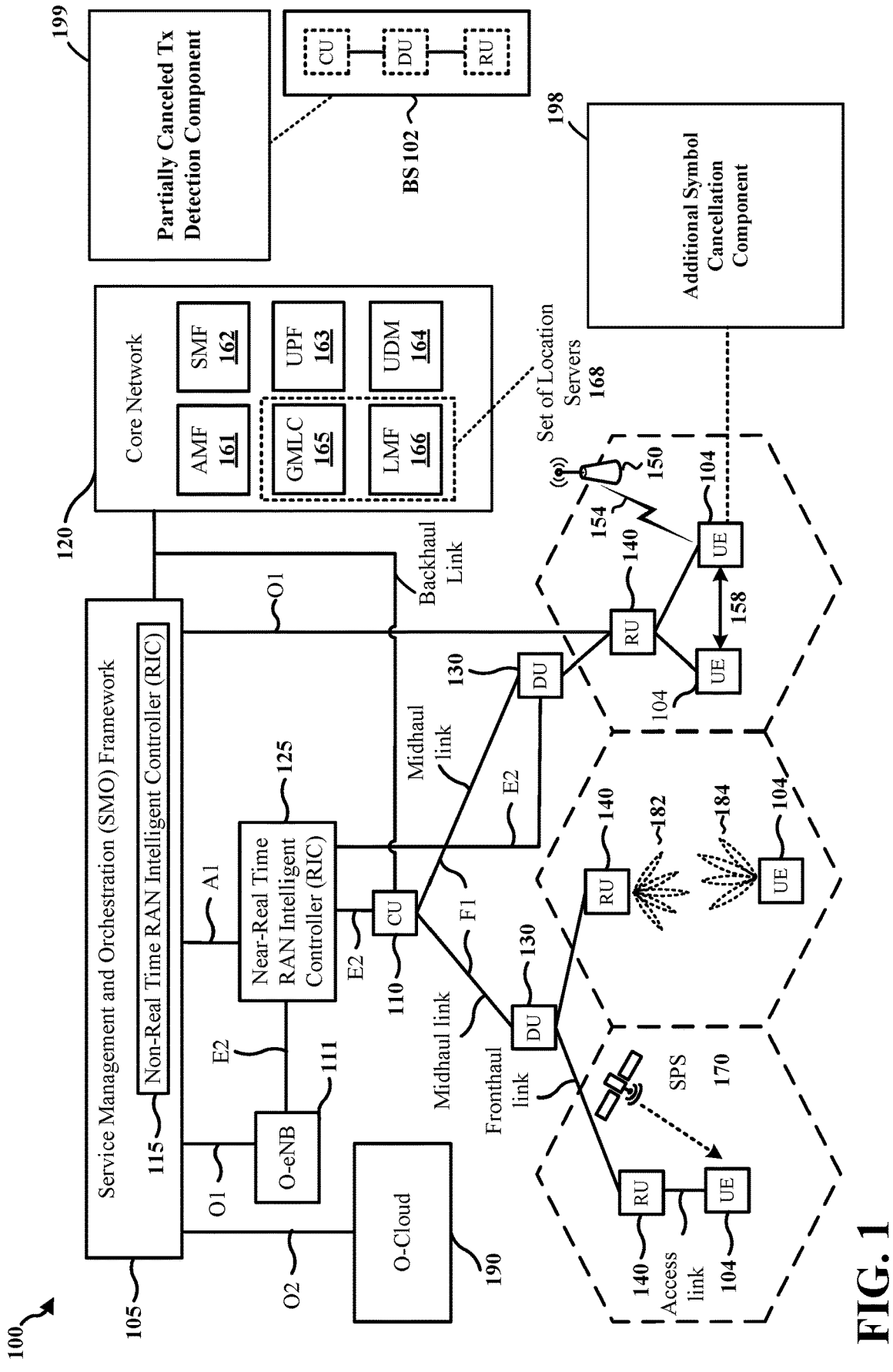
FIG. 1 is a diagram illustrating an example of a wireless communications system and an access network.

In some aspects of wireless communication, e.g., DSDA, a wireless device may be connected to two different RANs. For example, a wireless device may be configured to connect to a first RAN and a second RAN simultaneously (e.g., where either the first or second RAN may be an LTE RAN or a 5G NR RAN). The different RANs may schedule overlapping transmissions from the wireless device (e.g., transmissions from the wireless device scheduled for overlapping time periods and/or for overlapping time periods and frequencies). The wireless device, in some aspects, may not be able to transmit the overlapping transmissions (at least during the overlapping time period). The inability to transmit the overlapping transmissions, in some aspects, may be due to the hardware of the wireless device being unable to transmit two different signals at a same time (e.g., having one transceiver, one antenna, etc.) or based on external limitations (e.g., a maximum allowable transmission power). Based on the inability to transmit both transmissions during the overlapping time period, the wireless device may cancel at least one transmission during the overlapping time period (e.g., may blank, zero-out data tones, or refrain from transmitting during the overlapping time period). In some aspects, the wireless device may determine to cancel a first transmission in favor of a second transmission based on a relative priority of the overlapping transmissions (e.g., based on an associated RAN, type of data or channel, or time period).

For example, in a situation where a first transmission is associated with a low-priority communication with the first RAN and the second transmission is associated with a higher-priority communication with the second RAN, the wireless device may cancel, or blank, the overlapping portion of the low-priority communication. However, in some aspects, this partial blanking may not be the optimal solution for the low-priority communication (e.g., for a communication associated with a physical uplink shared channel (PUSCH)). For example, if the canceled, or blanked, portion of the first transmission includes one demodulation reference signal (DMRS or DM-RS), the canceling, or blanking, may render the first transmission undecodable at a receiving network device. In some aspects, the canceling, or blanking, of the at least one DMRS in the first transmission associated with a redundancy value (RV) of '0' may significantly corrupt and/or degrade the first transmission (e.g., the PUSCH transmission) to the extent that even a subsequent retransmission (e.g., an RV2, RV3, or RV1 retransmission using a corresponding RV of 2, 3, or 1, respectively) may not be decodable. Accordingly, a method and apparatus is provided to detect an overlapping transmission that may lead to canceling or blanking one DMRS of a first transmission of a first communication and to cancel additional portions (e.g., symbols) of the first transmission to cause a receiving network device to fail to identify or detect the first transmission and to use an RV of 0 for a subsequent grant for a (re)transmission of the first communication.

Particular aspects of the subject matter described in this disclosure can be implemented to realize one or more of the following potential advantages. In some examples, by canceling additional symbols beyond a minimal set of (overlapping) symbols for transmitting the second transmission, the described techniques may be used to avoid one or more retransmissions of a non-decodable first transmission (or communication) where the retransmissions may also not be decodable.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EE- PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs.

Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 500, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (510 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have an additional symbol cancellation component 198 that may be configured to configured to operate a first transceiver in a first connected mode with a RAN and a second transceiver in a second connected mode with a second RAN. The additional symbol cancellation component 198 may further be configured to initiate a transmission of a first communication via the first transceiver and obtain, based on a second communication via the second transceiver, an indication of a cancellation of a set of symbols for the first communication via the first transceiver. The additional symbol cancellation component 198 may also be configured to refrain from transmitting, based on the indication, a remaining portion of the first communication via the set of symbols, where the set of symbols includes one or more symbols that at least partially overlap with the second communication. In certain aspects, the base station 102 may have a partially canceled Tx detection component 199 that may be configured to grant, for a wireless device, a first set of resources for a first communication associated with a first RAN. The partially canceled Tx detection component 199 may further be configured to identify, based on receiving a portion of the first communication via a subset of the first set of resources, that the first set of resources does not include the first communication and to grant, based on identifying that the first set of resources does not include the first communication, a second set of additional resources for the first communication including a redundancy value associated with an initial transmission of the first communication. While the disclosure may focus on a DSDA wireless device in a connected mode with a two RANs (e.g., a first LTE RAN and a second 5G NR RAN), the disclosure relates to a multiply-connected wireless devices and multiple RANs generally.

Figures 2A, 2B, 2C, 2D:
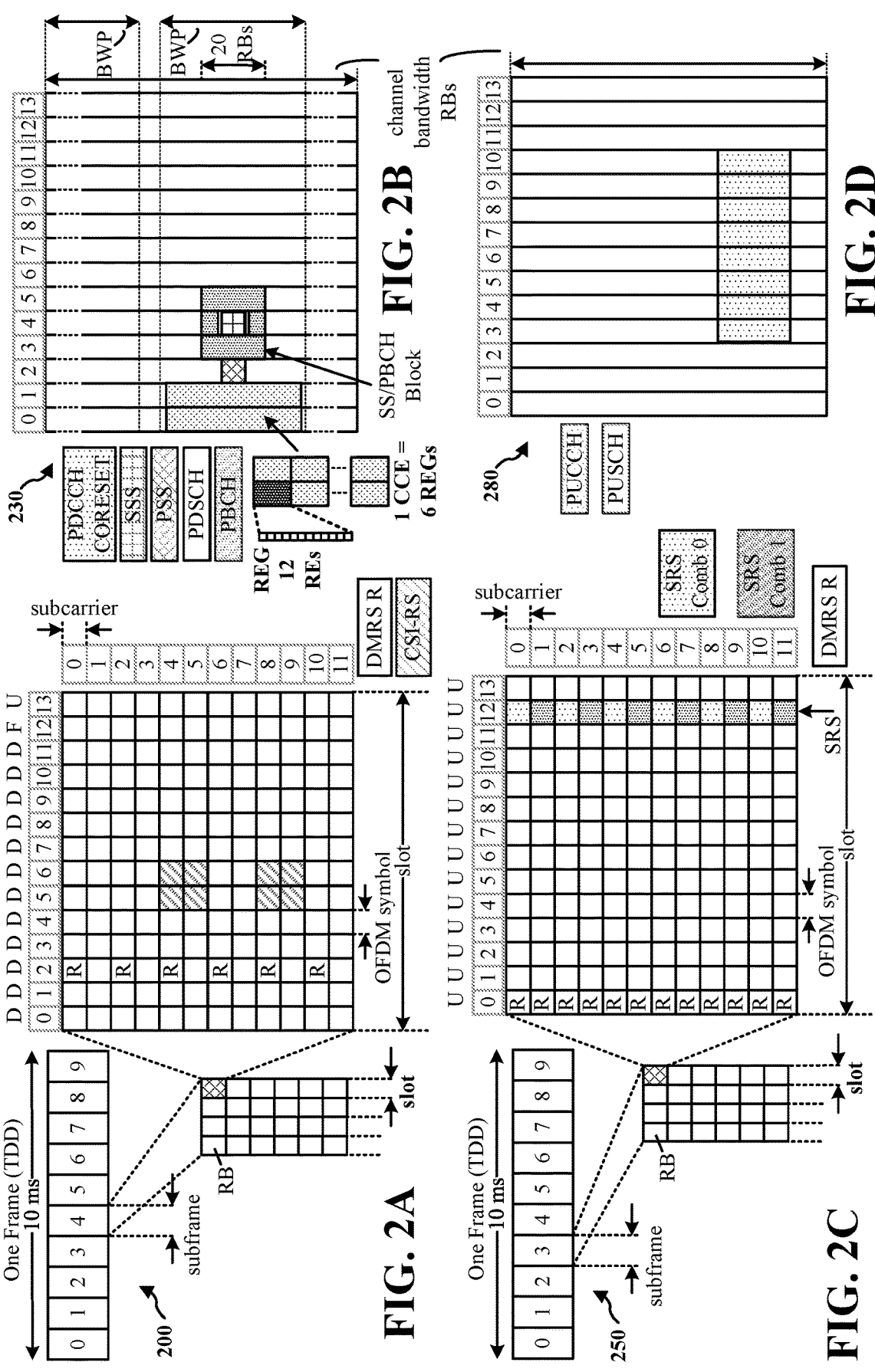
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| μ | SCS $\Delta f = 2^{\mu} \cdot 15[\text{kHz}]$ | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 580 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB)

(also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
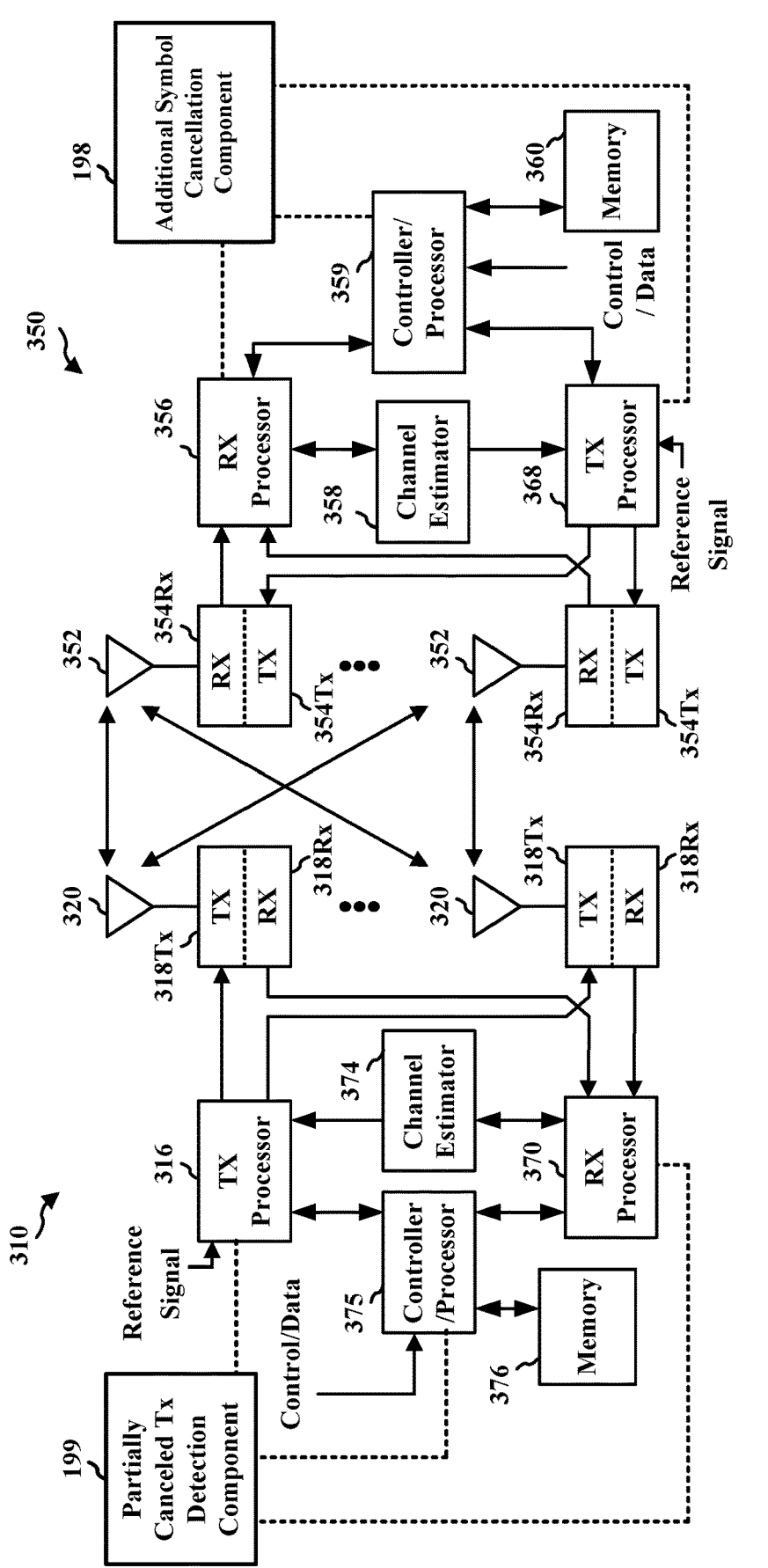
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the additional symbol cancellation component 198 of FIG. 1.

At least one of the TX processor 316, the RX processor 370, and the controller/processor 375 may be configured to perform aspects in connection with the partially canceled Tx detection component 199 of FIG. 1.

Figure 4:
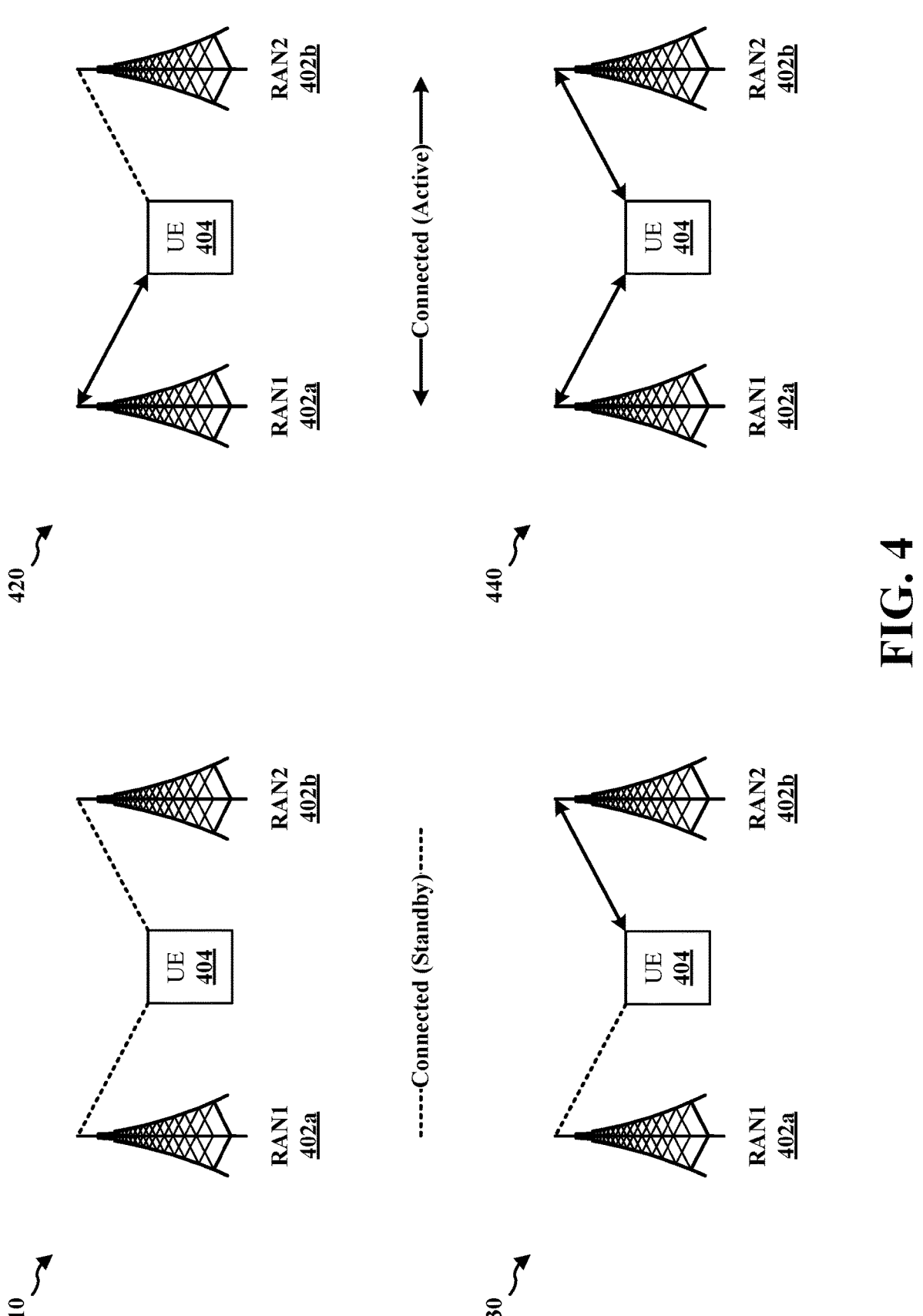
FIG. 4 is a set of diagrams illustrating modes of operation possible for a DSDA wireless device in communication with a first RAN and a second RAN in accordance with some aspects of the disclosure.

FIG. 4 is a set of diagrams (e.g., diagram 410, diagram 420, diagram 430, and diagram 440) illustrating modes of operation possible for a DSDA wireless device (e.g., UE 404) in communication with a first RAN (e.g., RAN1 402*a*) and a second RAN (RAN2 402*b*) in accordance with some aspects of the disclosure. Diagram 410 illustrates that the UE 404 at a first time may be connected in a standby mode to the RAN1 402*a* and to the RA2 402*b*. Diagram 420 illustrates that, at a second time, the UE 404 may be in active communication with the RAN1 402*a* and in a standby mode with the RAN2 402*b*. Diagram 430 illustrates that, at a third time, the UE 404 may be in active communication with the RAN2 402*b* and in a standby mode with the RAN1 402*a*. In some aspects, the UE 404 may have two or more transceivers and may, at a fourth time, be in active communication with the RAN1 402*a* and the RAN2 402*b*.

As described above, the UE 404 may be unable to transmit a first transmission for the RAN1 402*a* and a second transmission for the RAN2 402*b* (e.g., a second transmission overlapping the first transmission) at a same time. The inability to transmit the overlapping transmissions, in some aspects, may be due to the hardware of the wireless device being unable to transmit two different signals at a same time (e.g., having one transceiver, one antenna, etc.) or based on external limitations (e.g., a maximum allowable transmission power). Based on the inability to transmit both transmissions during the overlapping time period, the wireless device may cancel at least one transmission during the overlapping time period (e.g., may blank, zero-out data tones, or refrain from transmitting during the overlapping time period) as described below in relation to FIGS. 5 and 6.

As described below in relation to at least FIGS. 5-7, the method and apparatus may be used to identify situations in which (e.g., transmissions for which) canceling portions of the transmission may result in an undecodable or non-decodable transmission which may potentially impact (e.g., render undecodable or non-decodable) RV2, RV3, and/or RV1 retransmissions. Based on the identification, the method and apparatus, in some aspects, may cancel, (e.g., blank or zero out) the full (or a remaining portion of the) LTE subframe to utilize discontinuous transmission (DTx) detection at a network node (e.g., an eNB, gNB, base station, etc.). The DTx detection, in some aspects, may result in a new grant for an RV0 transmission associated with the (partially or mostly) canceled transmission thus avoiding the wasted resources associated with sending additional undecodable retransmissions.

For example, in some aspects, it may be the case that a blanking pattern and a DMRS symbol location correlates to RV2 decodability at a set signal quality (e.g., a set signal-to-noise ratio (SNR), signal-to-interference plus noise ratio (SINR), or channel quality indicator (CQI)). Further, an LTE PUSCH subframe, in some aspects, includes two DMRS symbols around the middle of the slot (e.g., in a fourth symbol (symbol 3) and an eleventh symbol (symbol 10) of a set of 14 symbols from symbol 0 to symbol 13). In some aspects, the cancelation, or blanking, of up to 3 symbols not including any DMRS symbol may not result in an RV2 retransmission being non-decodable at a set SNR (or SINR/ CQI). However, the cancelation, or blanking, of a partial slot (or subframe) including one DMRS symbol may negatively impact the RV0 decodability as well as the decodability of subsequent RV2, RV3, and/or RV1 retransmissions (e.g., render the RV0 transmission and the RV2, RV3, and/or RV1 retransmissions non-decodable) and may also lead to timing advance (TA) fluctuations. In order to avoid the problems with canceling a partial symbol including one DMRS, the method and apparatus may cancel additional symbols such that the (partially or fully canceled) transmission triggers DTx detection at a network node (e.g., eNB, gNB, base station, etc.) and a grant (or request) for a subsequent RV0 (re)transmission. In some aspects, the negative impact of canceling one DMRS symbols is not experienced when canceling both DMRS symbols as the cancelation of the two DMRS symbols (and the intervening symbols) is expected to trigger a DTx detection at the network node.

Figure 5:
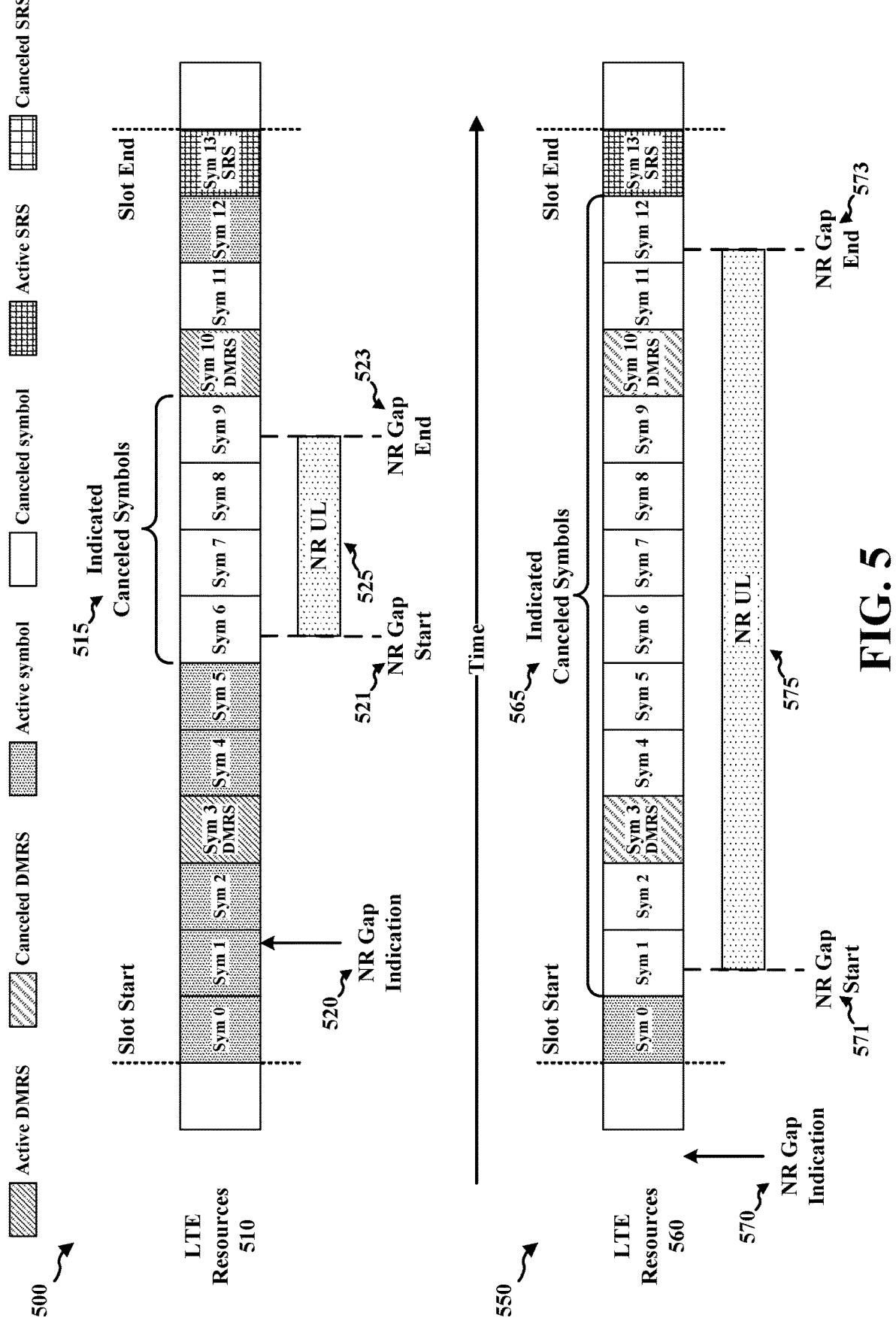
FIG. 5 is a set of diagrams illustrating examples of cancelling, or blanking, symbols of a first transmission based on an indication of a second transmission without canceling, or blanking, additional symbols in accordance with some aspects of the disclosure.

FIG. 5 is a set of diagrams 500 and 550 illustrating examples of cancelling, or blanking, symbols of a first transmission based on an indication of a second transmission without canceling, or blanking, additional symbols in accordance with some aspects of the disclosure. The canceling, or blanking, in some aspects, may be performed by a wireless device operating in a DSDA mode with one or more transceivers associated with two different RANs (e.g., the RAN1 402a and RAN2 402b). In some aspects, the wireless device may determine to cancel the first transmission in favor of the second transmission based on a relative priority of the overlapping transmissions (e.g., based on an associated RAN, type of data or channel, or time period). For example, during a first time period, communication with a first network (e.g., RAN1 402a) may generally be assigned a (local) higher priority than communication with the second network (e.g., RAN2 402b), while the relative (local) priority may be reversed during a second time period. The local priority, in some aspects, may be considered along with a priority of each communication when determining whether to cancel or blank (partially or fully) the first transmission or the second transmission.

Based on a determination to cancel the lower-priority (e.g., first) transmission, the wireless device may determine a set of symbols of the lower-priority transmission (e.g., a set of symbols including at least the symbols that overlap with the higher-priority (e.g., second) transmission) for cancelation. In some aspects, the determination may be made by a component of the wireless device such as a grant management unit (GMU) that is aware of resource grants associated with the different networks (e.g., RAN1 402a and RAN2 402b) and may include software configured to determine, based on conflicts between transmissions associated with the two networks, whether to cancel transmissions and/or which transmissions to cancel. In some aspects, the overlapping symbols may be indicated for cancelation (e.g., by the GMU) without indicating additional symbols for cancelation based on the lower-priority (first) transmission being decodable despite the cancelation of the overlapping symbols or, at least, being decodable based on a subsequent retransmission (e.g., an RV2, RV3, or RV1 retransmission). Diagrams 500 and 550, are discussed in terms of a first transmission associated with an LTE RAN and a second transmission associated with a 5G NR RAN although the first (lower-priority) and second (higher priority) transmission may be associated with any of a first LTE RAN, a second LTE RAN, a first 5G NR RAN, or a second 5G NR RAN.

Diagram 500 illustrates a first slot associated with a first (LTE UL) transmission via a set of LTE resources 510 that conflicts with a second (5G NR UL) transmission 525. In some aspects, the first transmission may be associated with a PUSCH while the second transmission may be associated with any UL channel (e.g., PUCCH, PUSCH, PUFCH, etc.), UL transmission, DL channel (e.g., PDCCH or PDSCH), or DL transmission. The wireless device may receive an NR grant (or gap) indication 520 that indicates NR grant (or gap) start 521 and NR grant (or gap) end 523 (e.g., the beginning and end of the resources associated with, or for, the second transmission, respectively). While shown as being received after the beginning of the transmission of the first transmission in the current slot, the NR grant (or gap) indication 520 may be received before the current slot. Based on the NR grant (or gap) indication 520, the wireless device may cancel a set of symbols 515 that overlap partially or fully with the resources associated with the second transmission and transmit the second (5G NR UL) transmission 525 within the canceled symbols (e.g., via the resources indicated in the NR grant (or gap) indication 520). As the canceled symbols do not include a DMRS symbol, the first transmission may be partially decodable at the receiving device (e.g., a base station of the first RAN) such that a retransmission (e.g., associated with subsequent a redundancy value RV2, RV3, or RV1) may be decodable based on the partially-decoded first transmission. Accordingly, no additional symbols beyond the indicated set of symbols 515 may be canceled. In the above discussion, the indication of the resources associated with the second transmission is referred to as the NR grant (or gap) indication 520 including the NR grant (or gap) start 521 and the NR grant (or gap) end 523 because the grant of the resources aligns with the gap (canceled symbols) associated with the grant for the second communication.

Diagram 550 illustrates a first slot associated with a first (LTE UL) transmission via a set of LTE resources 560 that conflicts with a second (5G NR UL) transmission 575. In some aspects, the first transmission may be associated with a PUSCH while the second transmission may be associated with any UL channel (e.g., PUCCH, PUSCH, PUFCH, etc.), UL transmission, DL channel (e.g., PDCCH or PDSCH), or DL transmission. The wireless device may receive an NR grant (or gap) indication 570 that indicates NR grant (or gap) start 571 and a NR grant (or gap) end 573 (e.g., the beginning and end of the second transmission, respectively). While shown as being received before the beginning of the transmission of the first transmission in the current slot, the NR grant (or gap) indication 570 may be received after the beginning of the current slot and before the second (5G NR UL) transmission 575. Based on the NR grant (or gap) indication 570, the wireless device may cancel a set of symbols 565 (e.g., overlapping symbols) and transmit the second (5G NR UL) transmission 575 within the canceled symbols. As the canceled symbols include both of the DMRS symbols (e.g., symbol 3 and symbol 10) in the current slot, the first transmission may not be identified and/or detected at the receiving device (e.g., a base station of the first RAN) such that a subsequent retransmission may be associated with a redundancy value RV0 (e.g., an RV associated with an initial transmission) in a subsequent grant as the receiving device failed to detect any transmission that may trigger proceeding to a next RV value (e.g., RV2, RV3, or RV1) for a retransmission. Accordingly, no additional symbols beyond the indicated set of symbols 565 may be canceled.

Figure 6:
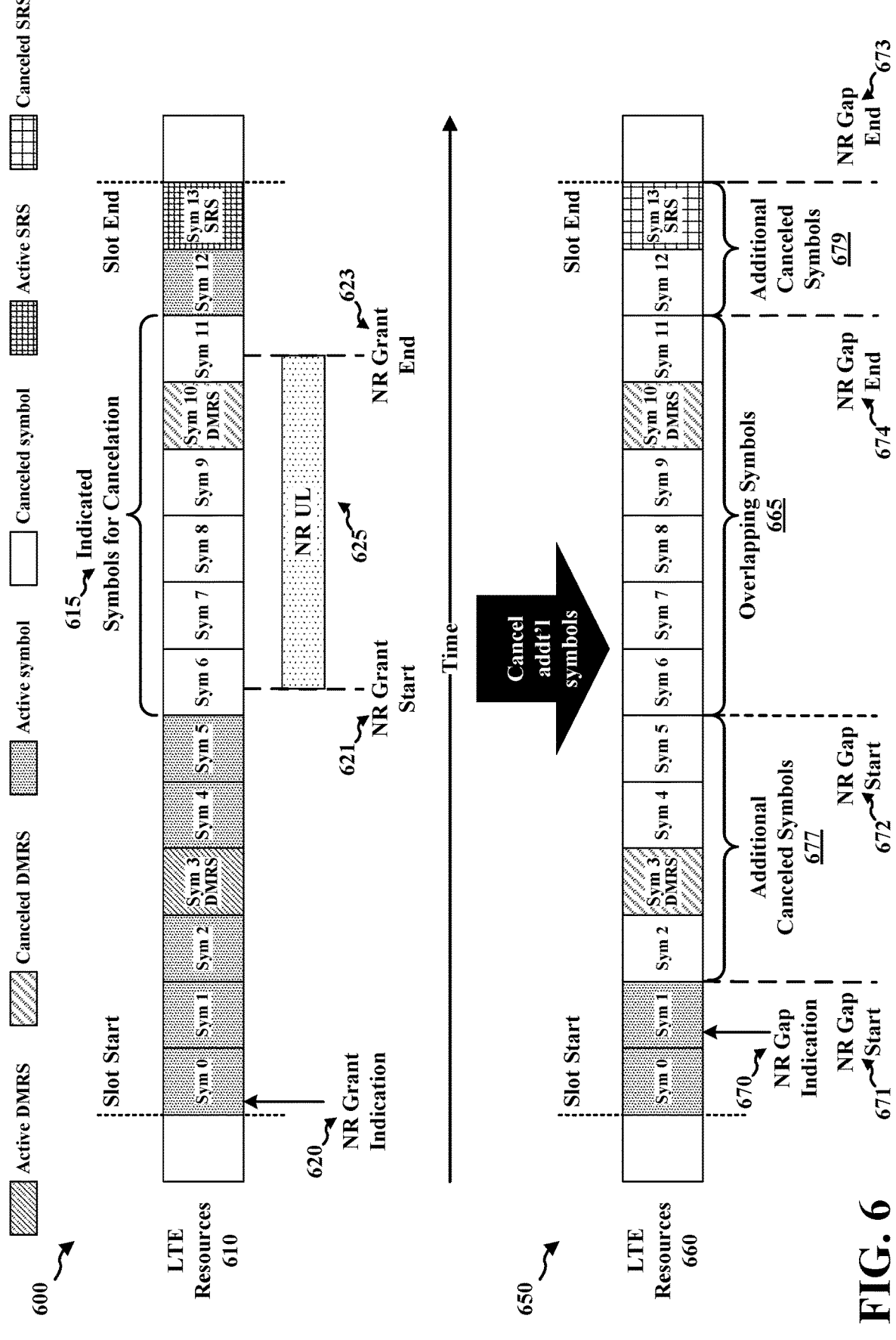
FIG. 6 is a set of diagrams illustrating examples of cancelling, or blanking, a set of symbols of a first transmission based on an indication of a second transmission where the set of symbols includes a set of overlapping symbols and one or more additional symbols in accordance with some aspects of the disclosure.

FIG. 6 is a set of diagrams 600 and 650 illustrating examples of cancelling, or blanking, a set of symbols of a first transmission based on an indication of a second transmission where the set of symbols includes a set of overlapping symbols (e.g., symbols associated with, or of, the first transmission that at least partially overlap with resources associated with the indicated second transmission) and one or more additional symbols in accordance with some aspects of the disclosure. In some aspects, the resources associated with the second transmission may include resources for transmitting the second transmission as well as gap, or guard band, resources in one or more of time and/or frequency that may not be used for transmitting the first transmission. As described in relation to FIG. 5, the canceling, or blanking, in some aspects, may be performed by a wireless device (or GMU of the wireless device) operating in a DSDA mode with one or more transceivers associated with two different RANs based on a relative priority of the overlapping transmissions. In some aspects, additional symbols may be canceled along with the symbols overlapping with resources associated with the second transmission based on the first transmission being undecodable if the overlapping symbols are canceled and subsequent retransmissions (e.g., using different RVs such as RV2, RV3, or RV1) also being undecodable if the overlapping symbols are canceled in the first transmission. Diagrams 600 and 650, are discussed in terms of a first transmission associated with an LTE RAN and a second transmission associated with a 5G NR RAN although the first (lower-priority) and second (higher priority) transmission may be associated with any or a first LTE RAN, a second LTE RAN, a first 5G NR RAN, or a second 5G NR RAN.

Diagram 600 illustrates a first slot associated with a first (LTE UL) transmission via a set of LTE resources 610 that conflicts with a second (5G NR UL) transmission 625. The wireless device may receive an NR grant indication 620 that indicates an NR grant start 621 and an NR grant end 623 (e.g., the beginning and end or the resources associated with, or for, the second transmission, respectively). In the discussion of FIG. 5 above, the indication of the resources associated with the second transmission is referred to as the NR grant (or gap) indication 520 (or 570) including the NR grant (or gap) start 521 (or 571) and the NR grant (or gap) end 523 (or 573) because the grant of the resources aligns with the gap (canceled symbols) associated with the grant for the second communication. However, for the discussion of FIG. 6 below, a distinction is made between an NR grant indication 620 and an NR gap indication 670 that may be generated at the wireless device (e.g., by the GMU) based on the NR grant indication 620. Similarly, the NR grant start 621 and the NR grant end 623 may be distinguished from the NR gap start 671 (or the NR gap start 672) and the NR gap end 673 (or the NR gap end 674) as the beginning and end times indicated by the NR grant indication 620 and the NR gap indication 670, respectively.

For example, the wireless device may receive a grant of resources for the second transmission, e.g., NR grant indication 620, that span the time between NR grant start 621 and NR grant end 623 (e.g., the beginning and end of the resources granted for the second transmission, respectively). While shown as being received after the beginning of the transmission of the first transmission in the current slot, the NR grant indication 620 may be received before the current slot. Based on the NR grant indication 620, the wireless device may identify symbols for cancelation 615 (e.g., may identify the overlapping symbols between the first transmission and the second transmission). The identified symbols may include a minimal group of symbols for transmitting the second (5G NR UL) transmission 625 without interference from, or conflict with, the first transmission.

The wireless device (or a grant management unit (GMU) of the wireless device) may identify that the symbols for cancelation 615 may meet a set of one or more criteria indicating that the first transmission may be undecodable at the receiving device with the canceled symbols and may cause subsequent retransmissions (e.g., using different RVs such as RV2, RV3, or RV1) to also be undecodable at the receiving device based on the canceled symbols of the first transmission. The set of criteria, in some aspects, may include a number of canceled symbols that exceed a threshold number of symbols or whether the canceled symbols include a DMRS symbol. In some aspects, the threshold number of symbols may be based on a MCS, a SNR, a SINR, or a CQI associated with the first communication. The set of criteria, in some aspects, may include a channel associated with the first communication, such as the channel being a PUSCH.

Diagram 650 illustrates that, based on the symbols for cancelation 615 (or overlapping symbols 665) meeting one or more of the set of criteria (e.g., including more than the threshold number of symbols or one of the two DMRS symbols), the wireless device may determine to cancel one or more of additional symbols 677 or additional symbols 679 in the set of LTE resources 660. Based on the determination, the wireless device (or GMU) may provide an NR gap indication 670 that may follow the NR grant indication 620 by a processing time (e.g., $t_{proc}$) and indicate one of an NR gap start 671 or an NR gap start 672 (e.g., indicating a beginning of the canceled symbols) and an NR gap end 673 or an NR gap end 674 (e.g., indicating an end of the canceled symbols). The additional symbols 677 and 679 may include symbols that precede and follow, respectively, the symbols for cancelation 615 indicated by the NR grant indication 620. The additional symbols 677 and 679 along with the symbols for cancelation 615, in some aspects, may include all the symbols following the symbol in which the NR gap indication 670 is provided and/or received (e.g., by a component of the wireless device implementing the cancelation) as shown, or may include all the symbols (not shown) in the slot including the second transmission, e.g., if the NR gap indication 670 is received in a previous slot and indicates that all the symbols of the slot associated with the second transmission may be (or are) canceled. In some aspects, one of the sets of additional symbols (e.g., additional symbols 677 or 679) may be canceled without canceling the other set of additional symbols (e.g., additional symbols 679 or 677, respectively). For example, canceling the overlapping symbols 665 and the additional symbols 677 (or the additional symbols 679) may result in the cancelation of a sufficient number of canceled symbols (or type of canceled symbols, such as DMRS or SRS symbols) to cause the network node (e.g., a base station) receiving the transmitted symbols to detect a discontinuous transmission (e.g., to detect a skipped slot, or to fail to detect the first transmission). In such cases, the overlapping symbols 665 and the additional symbols 677 (or the additional symbols 679) may be canceled while the additional symbols 679 (or the additional symbols 677) may not be canceled. The different combinations of canceled symbols, in some aspects, may be indicated by different combinations of NR gap start 671 or 672 and NR gap end 673 and 674 (where the indication of an NR gap that is defined by NR gap start 672 and NR gap end 674 may not be contemplated as an option in FIG. 6 as it may not be relevant where, as here, the resulting transmission may not be decodable and may cause subsequent transmissions to also not be decodable as described above).

FIG. 7 is a chart 700 illustrating a measure of decodability of an RV2 retransmission with no blanking following an RV0 transmission with a number, N, of blanked symbols for a given MCS in accordance with some aspects of the disclosure. The measure of decodability, in some aspects, may be a difference between a minimum SNR (e.g., as an example of a signal quality measurement) for decoding an RV0 transmission at 10% block error rate (BLER) (e.g., an $SNR_0$) and a minimum SNR for decoding a subsequent RV2 retransmission with no BLER (e.g., an $SNR_2$). A positive value for the difference (e.g., $SNR_0-SNR_2$) in chart 700 indicates that if the initial (RV0) transmission is transmitted and/or received with the minimum SNR (e.g., $SNR_0$), a subsequent (RV2) retransmission transmitted and/or received with the same SNR as the original (RV0) transmission (e.g., $SNR_0$) may be decodable (e.g., may be transmitted with an SNR above the minimum SNR ($SNR_2$) for decodability of the retransmission). Conversely, a negative value indicates that the minimum SNR (e.g., $SNR_2$) for decodability of the (RV2) retransmission is larger than the minimum SNR (e.g., $SNR_0$) for the original (RV0) transmission to be decoded with a 10% BLER. Accordingly, unless the original (RV0) transmission is transmitted with more than the minimum SNR (e.g., the $SNR_0$), the (RV2) retransmission transmitted at a same SNR as the original transmission may not be decodable. At some combination of canceled symbols and MCS (identified by the index used to indicate the MCS, e.g., in a DCI), the (RV2) retransmission may not be decodable even with an SNR as high as 40 dB.

Accordingly, the determination of whether to cancel additional symbols of a first transmission discussed in relation to FIGS. 5 and 6, may depend on the number of symbols to be canceled (e.g., a number of symbols associated with a second, higher-priority, transmission). The determination, in some aspects, may also depend on one or more of an MCS associated with the first transmission (and/or a subsequent retransmission), a BLER associated with the first transmission, or one of a SNR, SINR, or CQI. In some aspects, the determination may further be based on whether the canceled symbols include a DMRS symbol and whether the first transmission is associated with a PUSCH.

For example, for a first transmission transmitted with a SNR that is 1.0 dB above the minimum SNR (e.g., the $SNR_0$) and associated with an MCS index 14-16, a threshold number of canceled symbols not including a DMRS symbol may be 6. However, for a first transmission transmitted with a SNR that is at the minimum SNR (e.g., the $SNR_0$) and associated with the same MCS index (e.g., an MCS index of 14-16), a threshold number of canceled symbols not including a DMRS symbol may be 5, while for higher MCS index values the threshold number may be 4 (e.g., for an MCS index value of 20) or 3 (e.g., for an MCS index value of 22-26). Accordingly, the determination of whether to whether to cancel additional symbols of a first transmission discussed in relation to FIGS. 5 and 6 may be based on a SNR and MCS associated with the first (RV0) transmission (and a subsequent (RV2) retransmission).

Figure 8:
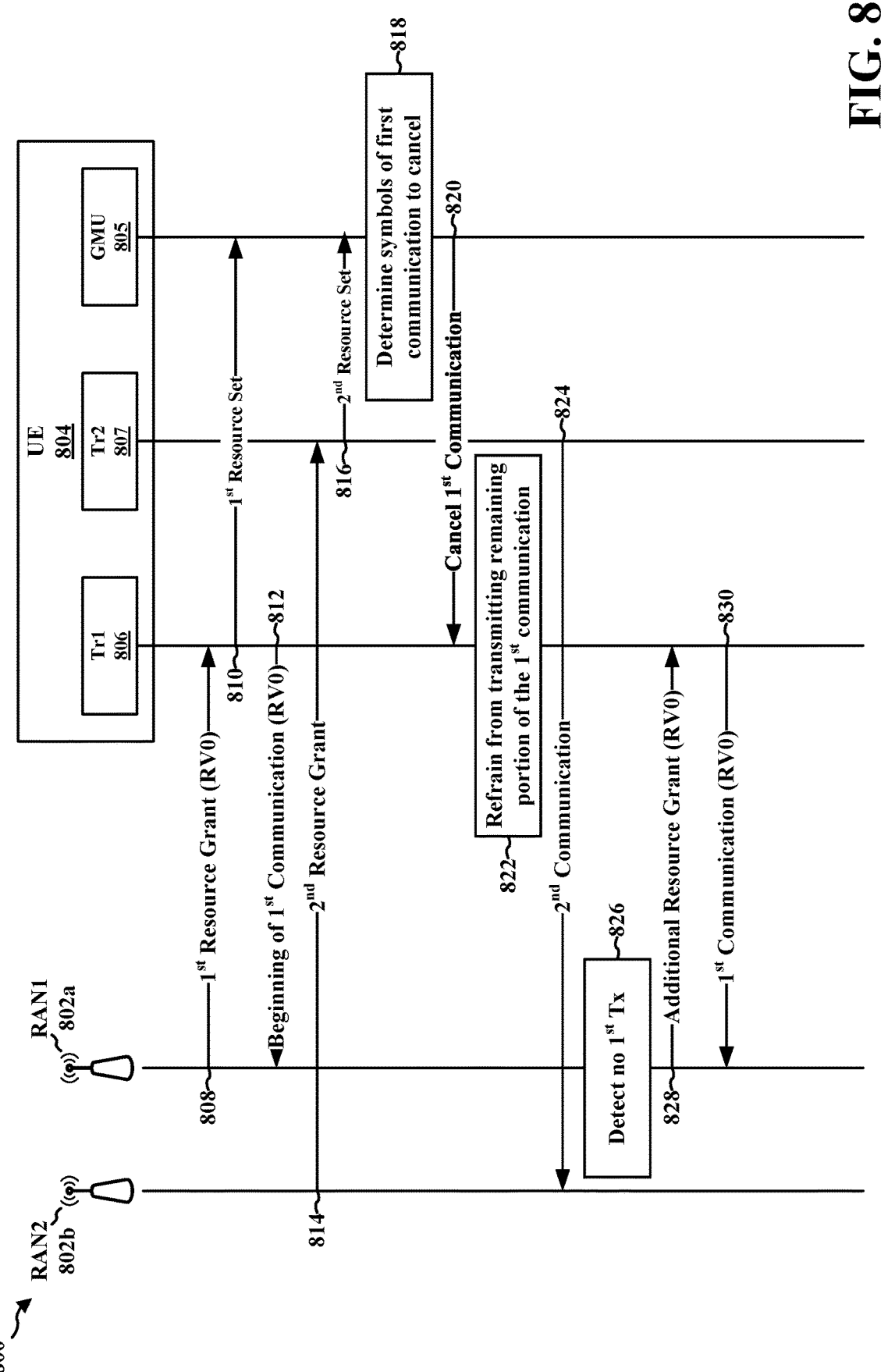
FIG. 8 is a call flow diagram of a method for canceling symbols of a first transmission from a wireless device based on a conflict with a second transmission from the wireless device in accordance with some aspects of the disclosure.

FIG. 8 is a call flow diagram 800 of a method for canceling symbols of a first transmission from a wireless device, e.g., the UE 804, based on a conflict with a second transmission from (or to) the wireless device in accordance with some aspects of the disclosure. The UE 804, in some aspects, may be capable of operating in a DSDA mode and may include a first transceiver, Tr1 806, and a second transceiver, Tr2 807. The two transceivers, Tr1 806 and Tr2 807, in some aspects, may be used to connect to two different RANs, e.g., RAN1 802a and RAN2 802b. In some aspects, the two transceivers, Tr1 806 and Tr2 807, may be replaced by a single transceiver that is capable of communicating with the two different RANs, RAN1 802a and RAN 802b, in the DSDA mode of operation. The UE 804, in some aspects, may further include a GMU 805 that may provide grant management functionality for the UE 804, e.g., may store and/or execute software for resolving conflicting grants of resources from the two different RANs (or from a same RAN). While the discussion below may recite transmissions from a particular RAN, it may be understood that the transmission may be from a network node, network device, or network component of the RAN such as a base station.

RAN1 802a may transmit, and the UE 804 may receive, via Tr1 806, a first grant 808 for a first set of resources for a first communication (e.g., a PUSCH) associated with RAN1 802a. Transmitting the first grant 808 may include transmitting DCI for scheduling the first (PUSCH) communication (or transmission) via the first set of resources (e.g., via a start and length indicator value (SLIV) and a frequency domain resource allocation (FDRA) or a resource indication value (RIV)), an indication of a MCS associated with the first communication, and an redundancy version value (e.g., a two-bit indicator with values ranging from 0 to 3) among other information (e.g., as defined for a DCI format 0_0 or other DCI format for scheduling PUSCH communication). An indication of the first set of resources may be provided to the GMU 805 as first resource set 810 based on the information included in the first grant 808. While illustrated as being provided from the first transceiver, Tr1 806, the first resource set 810, in some aspects, may be provided to the GMU 805 as part of processing and decoding the first grant 808 and may be provided from a component other than the transceiver. Based on the first grant 808, the UE 804 may transmit the beginning of the first communication via the first transceiver, Tr1 806. In some aspects, the beginning of the first communication 812 may instead be the beginning of a particular slot or subframe of the first communication 812.

The UE 804, either after transmitting the beginning of the first communication 812 (as shown) or before transmitting the beginning of the first communication 812 may receive a second grant 814 (e.g., via a second DCI) for a second set of resources for a second communication associated with RAN2 802b. The second set of resources may overlap in one or more of time and/or frequency with a set of symbols associated with the first communication. An indication of the second set of resources may be obtained by the GMU 805 as second resource set 816 based on the information included in the second grant 814. While illustrated as being provided from the second transceiver, Tr2 807, the GMU 805 may, in some aspects, obtain the second resource set 816 as part of processing and decoding the second grant 814 at the UE 804 and may be provided from a component of the UE 804 other than the transceiver.

Based on the indication of the first resource set 810 and the indication of the second resource set 816 obtained by the GMU 805, the GMU 805 may determine, at 818, to cancel a set of symbols of the first communication. As described above, the determination to cancel the set of symbols, in some aspects, may include a first determination that the second communication has a higher priority than the first communication. The first determination that the second communication has a higher priority than the first communication, in some aspects, may be based on a local priority and/or a priority associated with the channel (e.g., PUCCH vs. PUSCH) or type of communication (e.g., eMBB vs. URLLC) associated with each of the first communication and the second communication.

Assuming that the first communication is determined to be of lower priority than the second communication, the determination, at 818, in some aspects, may further include a determination of the set of symbols of the first communication to cancel. The determination, at 818, of the set of symbols of the first communication to cancel, in some aspects, may include a determination of whether canceling, or blanking, the symbols of the first communication overlapping with the second communication is likely to cause the first communication, and subsequent retransmissions, to be non-decodable by RAN1 802a (or a network node of RAN1 802a that receives the first communication with the overlapping symbols canceled). The determination of the likelihood of a partially-canceled first communication being non-decodable, in some aspects, may be based on one or more of a number of overlapping symbols to be canceled, whether the overlapping symbols include a DMRS symbol, an MCS associated with the first communication, and/or a signal quality (e.g., an SNR, SINR, or CQI) associated with the first communication as described above in relation to FIGS. 6 and 7. In some aspects, the determination at 818 is further based on determining that the first communication is associated with a PUSCH.

As discussed above, the set of symbols may be determined at 818 to include one or more symbols of the first communication indicated as overlapping with the second resource set 816. The set of symbols to be canceled, in some aspects, may include additional symbols of a slot or subframe including, or overlapping, the second transmission following the reception of the second grant 814 and prior to, or following, the symbols of the first communication indicated as overlapping with the second resource set 816. The additional symbols, in some aspects, may be selected, determined, and/or identified to trigger a DTx detection by RAN1 802a (e.g., to cause a network node of RAN1 802a to not detect the transmission of the first transmission in the slot or subframe including the second communication). Based on the determination at 818, the GMU 805, may output, and the first transceiver, Tr1 806, an indication 820 to cancel the set of symbols of the first communication.

Based on the indication 820 to cancel the set of symbols, the UE 804 (or the Tr1 806) may refrain, at 822, from transmitting the set of symbols of the remaining portion of the first communication (or a remaining portion of a current slot or subframe). During a time period in which the UE 804 (or Tr1 806) is refraining from transmitting the first communication, the UE 804 (or Tr2 807) may transmit, and RAN2 802b may receive, the second communication 824. After the transmission additional portions of the first communication may be transmitted (not shown) and the RAN1 802a may detect, at 826, a DTx (e.g., may fail to detect a transmission) during the slot or subframe including the canceled symbols. Based on the DTx detected at 826, the RAN1 802a may transmit, and the UE 804 (or Tr1 806) may receive, an additional resource grant 828 (e.g., via DCI) for a transmission of the first communication (e.g., a request for the first communication). The additional resource grant 828, in some aspects, may include an RV of 0 and the UE 804 may transmit (e.g., via Tr1 806), and RAN1 802a may receive, the first communication 830 based on the indicated RV of 0.

As described above, based on the inclusion of the additional symbols in the canceled set of symbols, the additional resource grant 828, in some aspects, may include a different RV (e.g., an RV of 0 instead of an RV of 2) than it would if the additional symbols had not been included in the canceled set of symbols. For example, if the additional symbols had not been included in the canceled set of symbols, the RAN1 802a (or a network node of RAN1 802a) may have received and/or detected an amount of energy associated with the first communication that was greater than a threshold amount of energy indicating a transmission and assumed that the first communication was fully transmitted. The RAN1 802a (or the network node of RAN1 802a) may have attempted, and failed, to decode the first communication, where the failure may be based, at least in part, on the canceled set of symbols. Based on the failure to decode the first communication, the RAN1 802a (or network node of RAN1 802a) may have transmitted a subsequent grant for a retransmission indicating an RV of 2 based on the assumption that the first communication was fully-transmitted and, because of the canceled set of symbols (not including the additional symbols), the RAN1 802a (or network node of RAN1 802a) may not have been able to decode the retransmission or additional retransmissions. Accordingly, by canceling the additional symbols the method, in some aspects, may avoid a set of failed retransmissions by causing RAN1 802a to detect no transmission and to transmit the additional resource grant 828 indicating an RV of 0 that may be decodable where an additional grant for a retransmission indicating an RV of 2 may (likely) not be decodable.

Figure 9:
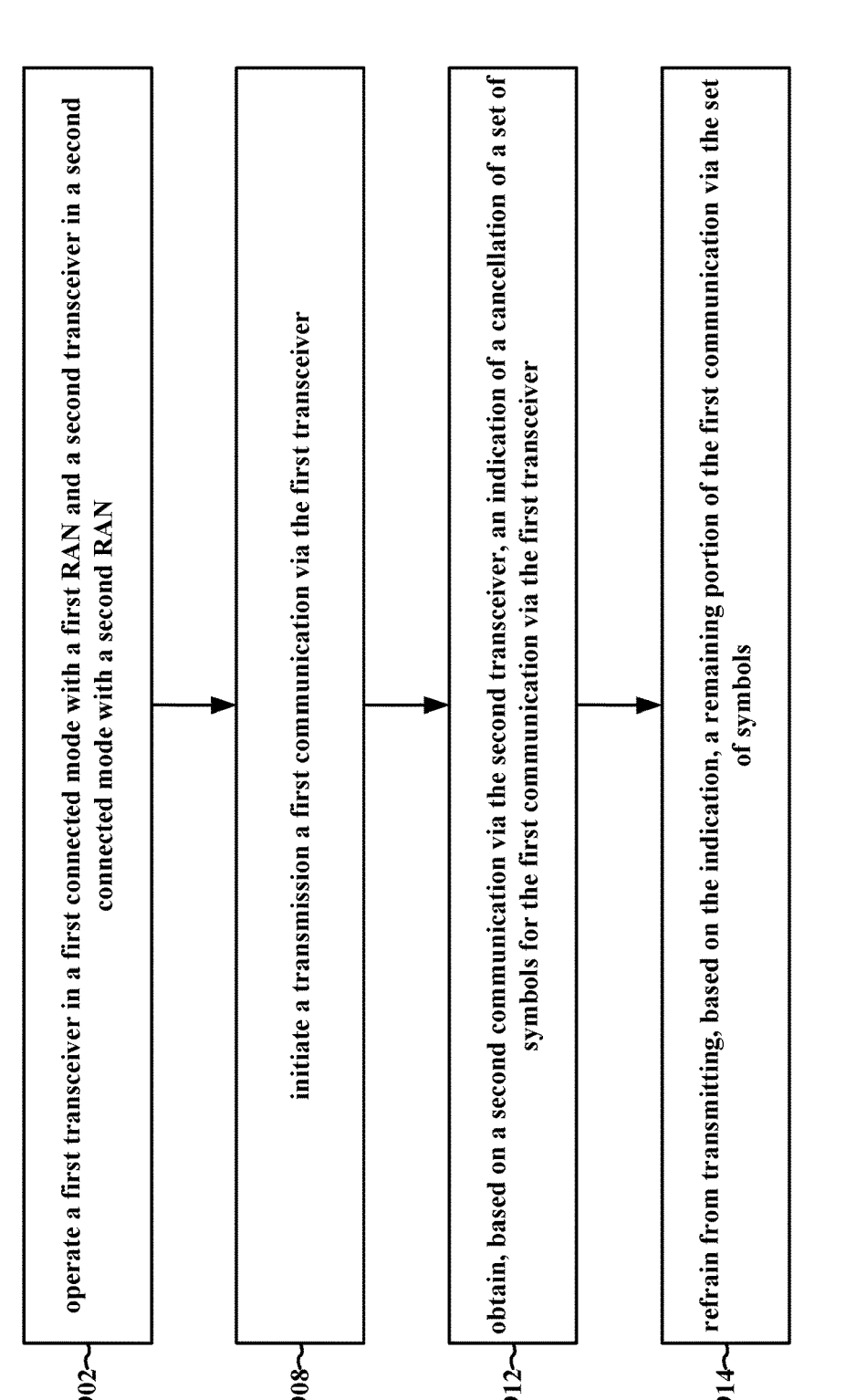
FIG. 9 is a flowchart of a method of wireless communication.

FIG. 9 is a flowchart 900 of a method of wireless communication. The method may be performed by a wireless device such as a UE (e.g., the UE 104, or 804; the apparatus 1204). At 902, the UE may operate a first transceiver in a first connected mode with a RAN and a second transceiver in a second connected mode with a second RAN. For example, 902 may be performed by application processor 1206, cellular baseband processor 1224, transceiver(s) 1222, antenna(s) 1280, and/or additional symbol cancellation component 198 of FIG. 12. In some aspects, the first and second transceiver may be a same transceiver that is used to communicate (or to connect) to both the first RAN and the second RAN. For example, referring to FIG. 8, the UE 804 may include two transceivers Tr1 806 and Tr2 807 connected to RAN1 802a and RAN2 802b, respectively.

In some aspects, the UE may receive, from a network node associated with the first RAN, a first grant for a first set of resources for a first communication. In some aspects, the first communication may be associated with a first priority based on a priority associated with the particular type of communication (e.g., eMBB, URLLC, etc.) and a locally-assigned priority independent of the priority associated with the particular type of communication. The first communication, in some aspects, may include a plurality of symbols in at least one slot or subframe. The first grant, in some aspects, may further include an RV of 0 associated with an initial transmission, where the RV indicates an amount of, or format for introducing, redundancy to be used when transmitting the first communication. For example, referring to FIGS. 5, 6, and 8, the UE 804 may receive a first grant 808 indicating a set of resources for a first (LTE UL) communication including at least the slot (and symbols) illustrated in the sets of LTE resources 510, 560, 610, and/or 660 of FIGS. 5 and 6.

The UE may also receive, from a second network node, a second grant for a second set of resources for a second communication associated with the second RAN via the second transceiver. In some aspects, the second communication may be associated with a second priority based on a priority associated with the particular type of communication (e.g., eMBB, URLLC, etc.) and a locally-assigned priority independent of the priority associated with the particular type of communication. The second communication, in some aspects, may have a higher relative priority than the first communication (e.g., the second priority may be higher than the first priority). The second communication, in some aspects, may include resources that overlap in time with one or more symbols of the plurality of symbols in at the least one slot or subframe associated with the first communication. In some aspects, the UE may not be capable of transmitting both the first and second communications during the time period in which they overlap. For example, referring to FIGS. 5, 6, and 8, the UE 804 may receive a second grant 814 indicating a set of resources for a second communication 824 (or second (5G NR UL) transmission 525, 575, or 625) including at least a portion of the slot (and symbols) granted in the first grant 808 and illustrated in the sets of LTE resources 510, 560, 610, and/or 660 for the first communication of FIGS. 5 and 6.

At 908, the UE may begin to transmit the first communication via the first transceiver. For example, 908 may be performed by application processor 1206, cellular baseband processor 1224, transceiver(s) 1222, antenna(s) 1280, and/or additional symbol cancellation component 198 of FIG. 12. In some aspects, beginning to transmit the first communication at 908, may be via the first set of resources indicated by the first grant. Beginning to transmit the first communication at 908, in some aspects, may include transmitting one or more slots and/or subframes before receiving the second grant or before reaching the symbol or subframe in which the overlap with the second communication occurs. For example, referring to FIGS. 5, 6, and 8, the UE 804 may transmit the beginning of the first communication 812 via the first transceiver, Tr1 806, e.g., via the symbols (symbol 0 or symbols 0 and 1) illustrated in the sets of LTE resources 510, 560, 610, and/or 660 of FIGS. 5 and 6.

The UE (or a component of the UE such as a GMU) may determine a set of symbols to cancel based on the grant for the second set of resources. In some aspects, determining the set of symbols to cancel includes a plurality of determinations. In some aspects, the UE may first determine that the UE is not capable of simultaneously transmitting the first communication and the second communication. The determination that the UE is not capable of simultaneously transmitting the first communication and the second communication, in some aspects, may be based on a hardware limitation or may be based on a maximum allowable transmission power that is exceeded when simultaneously transmitting the first communication and the second communication (e.g., when a power associated with simultaneously transmitting the first communication and the second communication exceeds a threshold power). The UE may then determine which communication to cancel (at least partially). In some aspects, the determination as to which communication to cancel may be based on a relative priority of the communications that is in turn based on a locally-assigned priority for communication associated with each RAN and a priority associated with each particular communication (e.g., based on a communication type or channel). As described above, the first communication is assumed for the purposes of the following discussion to be of lower priority and is therefore canceled (or blanked, zeroed-out, etc.) in favor of the second communication.

The determination of the set of symbols to cancel, in some aspects, may further include a determination that the first communication is associated with a PUSCH. If the first communication is not associated with a PUSCH, the method may simply cancel the overlapping symbols and not consider whether additional symbols may be canceled. After making the (preliminary) determinations described above, the UE (or GMU), in some aspects, may then proceed to determine the set of symbols of the first communication to cancel. The determination of the set of symbols of the first communication to cancel, in some aspects, may include identifying, based on the second resource grant, a set of one or more symbols overlapping with the second set of resources for the second communication. Based on the identified one or more symbols, the UE may determine whether canceling, or blanking, the set of one or more symbols of the first communication overlapping with the second communication is likely to cause the first communication, and subsequent retransmissions, to be non-decodable by a first RAN (or a network node of the first RAN that receives the first communication with the overlapping symbols canceled). The determination of the likelihood of a partially-canceled first communication being non-decodable, in some aspects, may be based on one or more of a number of overlapping symbols to be canceled (i.e., based on a threshold number of symbols), whether the overlapping symbols include a DMRS symbol, an MCS associated with the first communication, a signal quality (e.g., an SNR, SINR, or CQI) associated with the first communication, and/or a BLER associated with the first communication. For example, referring to FIGS. 5-8, the UE 804 (or the GMU 805) may determine, at 818, a set of symbols (e.g., the set of symbols 515, the set of symbols 565, and/or a combination of overlapping symbols 665 and one, or both, of additional symbols 677 or 679) to cancel. The determination at 818, in some aspects, may be based on the data in FIG. 7, a signal quality (e.g., SNR, SINR, CQI, or BLER) of the first communication, an MCS associated with the first communication, and a number (and nature) of overlapping symbols as illustrated in diagrams 500, 550, 600, and 650 of FIGS. 5 and 6.

At 912, the UE may obtain an indication of a cancellation of a set of symbols for the first communication. For example, 912 may be performed by application processor 1206, cellular baseband processor 1224, transceiver(s) 1222, antenna(s) 1280, and/or additional symbol cancellation component 198 of FIG. 12. The set of symbols, in some aspects, may include one or more symbols that at least partially overlap with the second communication. In some aspects, the indication may be based on the second communication via the second transceiver (e.g., based on the second grant for the second set of resources associated with the second communication). In some aspects, the indication may be obtained from a component (e.g., the GMU) of the UE that determines the set of symbols to cancel. In some aspects, the second grant may be a first indication to cancel one or more overlapping symbols that may then be analyzed to determine whether to cancel additional symbols and produce the indication obtained at 912 of a cancellation of the set of symbols (e.g., the determined set of symbols). The indication of the set of symbols to cancel may be explicit (may identify specific symbols for cancelation) or implicit (e.g., may identify criteria for cancelation). As an example of an implicit indication of the set of symbols, in some aspects, the indication may include an indication to cancel all symbols in the slot containing the one or more overlapping symbols following the indication obtained at 912. For example, if the indication obtained at 912 is received after transmission of a first symbol in the slot with overlapping symbols, it may indicate for, or cause, the subsequent symbols of the slot to be canceled, or if the indication is obtained at 912 prior to the beginning of the slot with overlapping symbols, it may indicate for, or cause, all the symbols of that slot to be canceled. For example, referring to FIGS. 6 and 8, the UE 804, may obtain the indication 820 to cancel the set of symbols of the first communication (corresponding to NR gap indication 670) and may cancel all subsequent symbols of the current slot based on an explicit or implicit indication.

At 914, the UE may refrain from transmitting, based on the indication obtained at 912, a remaining portion of the first communication via a set of symbols including the one or more symbols. For example, 914 may be performed by application processor 1206, cellular baseband processor 1224, transceiver(s) 1222, antenna(s) 1280, and/or additional symbol cancellation component 198 of FIG. 12. In some aspects, the set of symbols includes the one or more overlapping symbols and one or more additional symbols of the remaining portion of the first communication. The one or more additional symbols includes, in some aspects, may include at least one symbol that precedes the one or more symbols and/or at least one symbol that follows the one or more symbols. As discussed above, the cancelation of the one or more additional symbols (e.g., the inclusion of the one or more additional symbols in the set of symbols) may be based on the one or more (overlapping) symbols meeting a set of one or more criteria. For example, referring to FIGS. 6 and 8, the UE 804, may refrain, at 822, from transmitting the set of symbols of the remaining portion of the first communication (e.g., additional symbols 677, overlapping symbols 665, and additional symbols 679) based on the indication 820 (or NR gap indication 670).

The UE may transmit the second communication via the one or more (overlapping) symbols. As described above, in some aspects, the second communication may be associated with a second set of resources that overlaps with the one or more (overlapping) symbols but not the additional symbols that may be included in the set of symbols canceled for the first communication. Accordingly, the second communication may be transmitted, in some aspects, via the one or more (overlapping) symbols, but not the one or more additional symbols. For example, referring to FIGS. 6 and 8, the UE 804, may transmit the second communication 824 (or second (5G NR UL) transmission 625) via the overlapping symbols 665 (but not the additional symbols 677 or 679).

Figure 10:
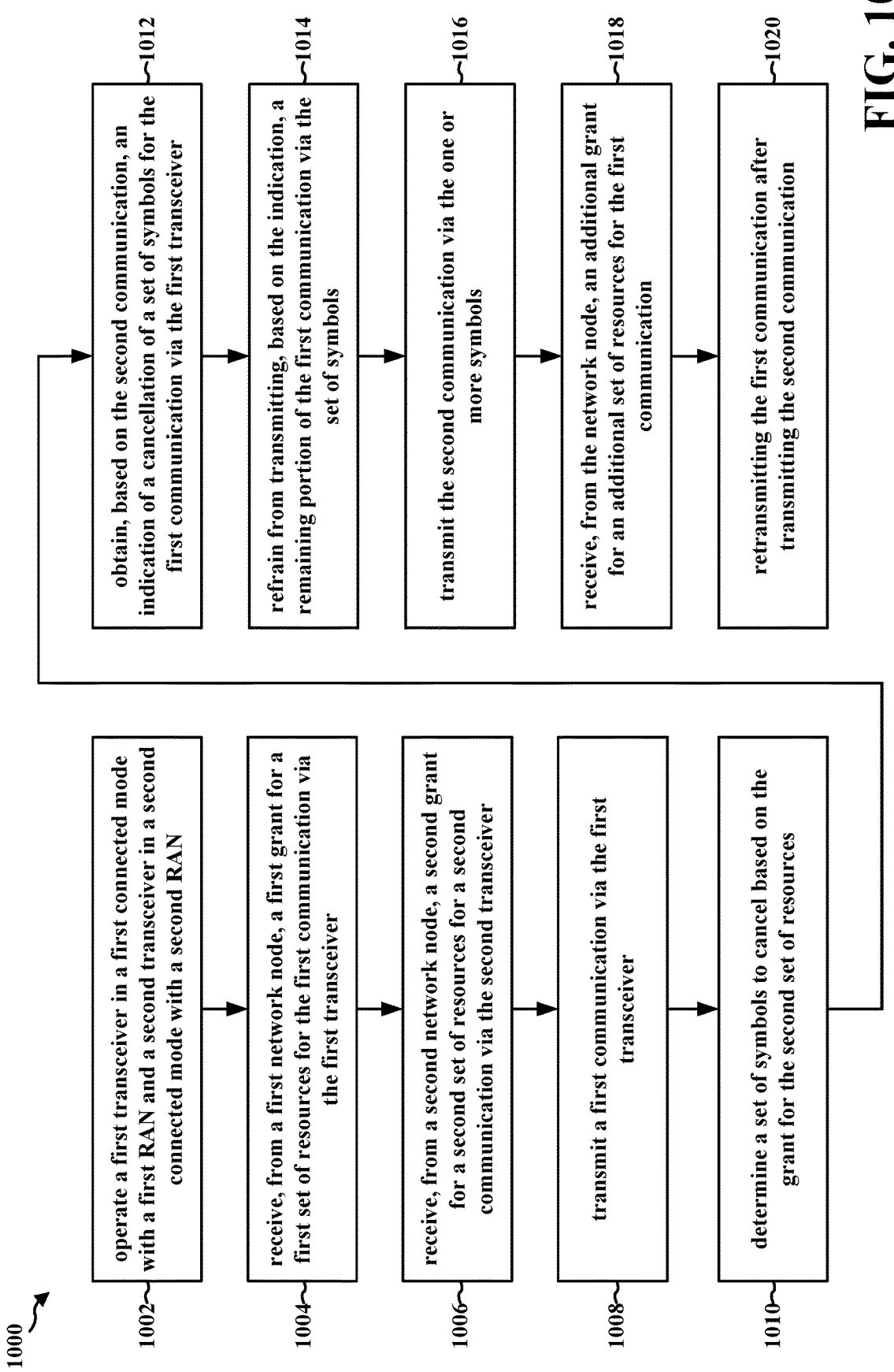
FIG. 10 is a flowchart of a method of wireless communication.

The UE may also receive, from a network node associated with the first RAN, an additional grant for an additional set of resources for the first communication. The additional grant for the additional set of resources for the first communication, in some aspects, may indicate an RV associated with an initial transmission (an RV of 0). In some aspects, the indication of the RV of 0 may be based on the wireless device refraining from transmitting the remaining portion of the first communication via the set of symbols such that the network node associated with the first RAN detects a DTx (e.g., fails to detect a transmission via the first set of resources). For example, referring to FIG. 8, the UE 804, may receive additional resource grant 828 indicating an RV of 0. Accordingly, the UE may retransmit, via the additional set of resources, the first communication after transmitting the second communication. The retransmission, in some aspects, may be based on the RV of 0, allowing the retransmission to be decodable at the network node associated with the first RAN. For example, referring to FIG. 8, the UE 804, may transmit first communication 830 based on an RV of 0.A FIG. 10 is a flowchart 1000 of a method of wireless communication. The method may be performed by a wireless device such as a UE (e.g., the UE 104, or 804; the apparatus 1204). At 1002, the UE may operate a first transceiver in a first connected mode with a RAN and a second transceiver in a second connected mode with a second RAN. For example, 1002 may be performed by application processor 1206, cellular baseband processor 1224, transceiver(s) 1222, antenna(s) 1280, and/or additional symbol cancellation component 198 of FIG. 12. In some aspects, the first and second transceiver may be a same transceiver that is used to communicate (or to connect) to both the first RAN and the second RAN. For example, referring to FIG. 8, the UE 804 may include two transceivers Tr1 806 and Tr2 807 connected to RAN1 802a and RAN2 802b, respectively.

At 1004, the UE may receive, from a network node associated with the first RAN, a first grant for a first set of resources for a first communication. For example, 1004 may be performed by application processor 1206, cellular baseband processor 1224, transceiver(s) 1222, antenna(s) 1280, and/or additional symbol cancellation component 198 of FIG. 12. In some aspects, the first communication may be associated with a first priority based on a priority associated with the particular type of communication (e.g., eMBB, URLLC, etc.) and a locally-assigned priority independent of the priority associated with the particular type of communication. The first communication, in some aspects, may include a plurality of symbols in at least one slot or subframe. The first grant, in some aspects, may further include an RV of 0 associated with an initial transmission, where the RV indicates an amount of, or format for introducing, redundancy to be used when transmitting the first communication. For example, referring to FIGS. 5, 6, and 8, the UE 804 may receive a first grant 808 indicating a set of resources for a first (LTE UL) communication including at least the slot (and symbols) illustrated in the sets of LTE resources 510, 560, 610, and/or 660 of FIGS. 5 and 6.

At 1006, the UE may receive, from a second network node, a second grant for a second set of resources for a second communication associated with the second RAN via the second transceiver. For example, 1006 may be performed by application processor 1206, cellular baseband processor 1224, transceiver(s) 1222, antenna(s) 1280, and/or additional symbol cancellation component 198 of FIG. 12. In some aspects, the second communication may be associated with a second priority based on a priority associated with the particular type of communication (e.g., eMBB, URLLC, etc.) and a locally-assigned priority independent of the priority associated with the particular type of communication. The second communication, in some aspects, may have a higher relative priority than the first communication (e.g., the second priority may be higher than the first priority). The second communication, in some aspects, may include resources that overlap in time with one or more symbols of the plurality of symbols in at the least one slot or subframe associated with the first communication. In some aspects, the UE may not be capable of transmitting both the first and second communications during the time period in which they overlap. For example, referring to FIGS. 5, 6, and 8, the UE 804 may receive a second grant

814 indicating a set of resources for a second communication 824 (or second (5G NR UL) transmission 525, 575, or 625) including at least a portion of the slot (and symbols) granted in the first grant 808 and illustrated in the sets of LTE resources 510, 560, 610, and/or 660 for the first communication of FIGS. 5 and 6.

At 1008, the UE may begin to transmit the first communication via the first transceiver. For example, 1008 may be performed by application processor 1206, cellular baseband processor 1224, transceiver(s) 1222, antenna(s) 1280, and/or additional symbol cancellation component 198 of FIG. 12. In some aspects, beginning to transmit the first communication at 1008, may be via the first set of resources indicated by the first grant received at 1004. Beginning to transmit the first communication at 1008, in some aspects, may include transmitting one or more slots and/or subframes before receiving the second grant at 1006 or before reaching the symbol or subframe in which the overlap with the second communication occurs. For example, referring to FIGS. 5, 6, and 8, the UE 804 may transmit the beginning of the first communication 812 via the first transceiver, Tr1 806, e.g., via the symbols (symbol 0 or symbols 0 and 1) illustrated in the sets of LTE resources 510, 560, 610, and/or 660 of FIGS. 5 and 6.

At 1010, the UE (or a component of the UE such as a GMU) may determine a set of symbols to cancel based on the grant for the second set of resources. For example, 1010 may be performed by application processor 1206, cellular baseband processor 1224, and/or additional symbol cancellation component 198 of FIG. 12. In some aspects, determining the set of symbols to cancel at 1010 includes a plurality of determinations. In some aspects, the UE may first determine that the UE is not capable of simultaneously transmitting the first communication and the second communication. The determination that the UE is not capable of simultaneously transmitting the first communication and the second communication, in some aspects, may be based on a hardware limitation or may be based on a maximum allowable transmission power that is exceeded when simultaneously transmitting the first communication and the second communication (e.g., when a power associated with simultaneously transmitting the first communication and the second communication exceeds a threshold power). The UE may then determine which communication to cancel (at least partially). In some aspects, the determination as to which communication to cancel may be based on a relative priority of the communications that is in turn based on a locally-assigned priority for communication associated with each RAN and a priority associated with each particular communication (e.g., based on a communication type or channel). As described above, the first communication is assumed for the purposes of the following discussion to be of lower priority and is therefore canceled (or blanked, zeroed-out, etc.) in favor of the second communication.

The determination at 1010, in some aspects, may further include a determination that the first communication is associated with a PUSCH. If the first communication is not associated with a PUSCH, the method may simply cancel the overlapping symbols and not consider whether additional symbols may be canceled. After making the (preliminary) determinations described above, the determination, at 1010, in some aspects, may then proceed to determine the set of symbols of the first communication to cancel. The determination, at 1010, of the set of symbols of the first communication to cancel, in some aspects, may include identifying, based on the second resource grant received at 1006, a set of one or more symbols overlapping with the second set of resources for the second communication. Based on the identified one or more symbols, the UE may determine, at 1010, whether canceling, or blanking, the set of one or more symbols of the first communication overlapping with the second communication is likely to cause the first communication, and subsequent retransmissions, to be non-decodable by a first RAN (or a network node of the first RAN that receives the first communication with the overlapping symbols canceled). The determination of the likelihood of a partially-canceled first communication being non-decodable, in some aspects, may be based on one or more of a number of overlapping symbols to be canceled (i.e., based on a threshold number of symbols), whether the overlapping symbols include a DMRS symbol, an MCS associated with the first communication, a signal quality (e.g., an SNR, SINR, or CQI) associated with the first communication, and/or a BLER associated with the first communication. For example, referring to FIGS. 5-8, the UE 804 (or the GMU 805) may determine, at 818, a set of symbols (e.g., the set of symbols 515, the set of symbols 565, and/or a combination of overlapping symbols 665 and one, or both, of additional symbols 677 or 679) to cancel. The determination at 818, in some aspects, may be based on the data in FIG. 7, a signal quality (e.g., SNR, SINR, CQI, or BLER) of the first communication, an MCS associated with the first communication, and a number (and nature) of overlapping symbols as illustrated in diagrams 500, 550, 600, and 650 of FIGS. 5 and 6.

At 1012, the UE may obtain an indication of a cancellation of a set of symbols for the first communication. For example, 1012 may be performed by application processor 1206, cellular baseband processor 1224, transceiver(s) 1222, antenna(s) 1280, and/or additional symbol cancellation component 198 of FIG. 12. The set of symbols, in some aspects, may include one or more symbols that at least partially overlap with the second communication. In some aspects, the indication may be based on the second communication via the second transceiver (e.g., based on the second grant for the second set of resources associated with the second communication). In some aspects, the indication may be obtained from a component (e.g., the GMU) of the UE that determines the set of symbols to cancel at 1010. In some aspects, the second grant received at 1006 may be a first indication to cancel one or more overlapping symbols that may then be analyzed to determine at 1010 whether to cancel additional symbols and produce the indication obtained at 1012 of a cancellation of the set of symbols (e.g., the set of symbols determined at 1010). The indication of the set of symbols to cancel may be explicit (may identify specific symbols for cancelation) or implicit (e.g., may identify criteria for cancelation). As an example of an implicit indication of the set of symbols, in some aspects, the indication may include an indication to cancel all symbols in the slot containing the one or more overlapping symbols following the indication obtained at 1012. For example, if the indication obtained at 1012 is received after transmission of a first symbol in the slot with overlapping symbols, it may indicate for, or cause, the subsequent symbols of the slot to be canceled, or if the indication is obtained at 1012 prior to the beginning of the slot with overlapping symbols, it may indicate for, or cause, all the symbols of that slot to be canceled. For example, referring to FIGS. 6 and 8, the UE 804, may obtain the indication 820 to cancel the set of symbols of the first communication (corresponding to NR gap indication 670) and may cancel all subsequent symbols of the current slot based on an explicit or implicit indication.

At 1014, the UE may refrain from transmitting, based on the indication obtained at 1012, a remaining portion of the first communication via a set of symbols including the one or more symbols. For example, 1014 may be performed by application processor 1206, cellular baseband processor 1224, transceiver(s) 1222, antenna(s) 1280, and/or additional symbol cancellation component 198 of FIG. 12. In some aspects, the set of symbols includes the one or more overlapping symbols and one or more additional symbols of the remaining portion of the first communication. The one or more additional symbols includes, in some aspects, may include at least one symbol that precedes the one or more symbols and/or at least one symbol that follows the one or more symbols. As discussed above, the cancelation of the one or more additional symbols (e.g., the inclusion of the one or more additional symbols in the set of symbols) may be based on the one or more (overlapping) symbols meeting a set of one or more criteria. For example, referring to FIGS. 6 and 8, the UE 804, may refrain, at 822, from transmitting the set of symbols of the remaining portion of the first communication (e.g., additional symbols 677, overlapping symbols 665, and additional symbols 679) based on the indication 820 (or NR gap indication 670).

At 1016, the UE may transmit the second communication via the one or more (overlapping) symbols. For example, 1016 may be performed by application processor 1206, cellular baseband processor 1224, transceiver(s) 1222, antenna(s) 1280, and/or additional symbol cancellation component 198 of FIG. 12. As described above, in some aspects, the second communication may be associated with a second set of resources that overlaps with the one or more (overlapping) symbols but not the additional symbols that may be included in the set of symbols canceled for the first communication. Accordingly, the second communication may be transmitted, in some aspects, via the one or more (overlapping) symbols, but not the one or more additional symbols. For example, referring to FIGS. 6 and 8, the UE 804, may transmit the second communication 824 (or second (5G NR UL) transmission 625) via the overlapping symbols 665 (but not the additional symbols 677 or 679).

At 1018, the UE may receive, from a network node associated with the first RAN, an additional grant for an additional set of resources for the first communication. For example, 1018 may be performed by application processor 1206, cellular baseband processor 1224, transceiver(s) 1222, antenna(s) 1280, and/or additional symbol cancellation component 198 of FIG. 12. The additional grant for the additional set of resources for the first communication, in some aspects, may indicate an RV associated with an initial transmission (an RV of 0). In some aspects, the indication of the RV of 0 may be based on the wireless device refraining from transmitting the remaining portion of the first communication via the set of symbols such that the network node associated with the first RAN detects a DTx (e.g., fails to detect a transmission via the first set of resources). For example, referring to FIG. 8, the UE 804, may receive additional resource grant 828 indicating an RV of 0.

Accordingly, at 1020, the UE may retransmit, via the additional set of resources, the first communication after transmitting the second communication. For example, 1020 may be performed by application processor 1206, cellular baseband processor 1224, transceiver(s) 1222, antenna(s) 1280, and/or additional symbol cancellation component 198 of FIG. 12. The retransmission, in some aspects, may be based on the RV of 0, allowing the retransmission to be decodable at the network node associated with the first RAN. For example, referring to FIG. 8, the UE 804, may transmit first communication 830 based on an RV of 0.

FIG. 11 is a flowchart 1100 of a method of wireless communication. The method may be performed by a network device or network node (e.g., a base station) of a first RAN (e.g., the base station 102; the network entity 1302; a base station associated with RAN1 802*a*). At 1102, the network node may grant, for a wireless device, a first set of resources for a first communication associated with a first radio access network. For example, 1102 may be performed by CU processor 1312, DU processor 1332, RU processor 1342, transceiver(s) 1346, antenna(s) 1380, and/or partially canceled Tx detection component 199 of FIG. 13. In some aspects, granting the first set of resources for the first communication at 1102 includes transmitting, for the wireless device, a first grant (e.g., via DCI) for the first set of resources for the first communication. For example, referring to FIG. 8, a network node of the RAN1 802*a*, may transmit the first grant 808 for a first set of resources for a first communication with the RAN1 802*a*.

At 1104, the network node may identify, based on receiving a portion of the first communication via a subset of the first set of resources, that the first set of resources does not include the first communication. For example, 1104 may be performed by CU processor 1312, DU processor 1332, RU processor 1342, transceiver(s) 1346, antenna(s) 1380, and/or partially canceled Tx detection component 199 of FIG. 13. In some aspects, identifying that the first set of resources does not include the first communication may include detecting a DTx from the wireless device. For example, referring to FIG. 8, a network node of the RAN1 802*a*, may receive the beginning of the first communication 812 that is then partially canceled by the UE 804 (by refraining, at 822, from transmitting a remaining portion of the first communication 812) and detect, at 826, a DTx (e.g., may fail to detect a transmission) during the slot or subframe including the canceled symbols.

At 1106, the network node may grant, based on identifying that the first set of resources does not include the first communication, a second set of additional resources for the first communication including a redundancy value associated with an initial transmission of the first communication. For example, 1106 may be performed by CU processor 1312, DU processor 1332, RU processor 1342, transceiver(s) 1346, antenna(s) 1380, and/or partially canceled Tx detection component 199 of FIG. 13. In some aspects, granting the second set of additional resources for the first communication may include transmitting, for the wireless device, a second grant for the second set of additional resources for the first communication. For example, referring to FIG. 8, the UE 804, may receive additional resource grant 828 indicating an RV of 0.

Based on the grant of the second set of additional resources, the network node may receive, via the second set of additional resources, the first communication. The retransmission, in some aspects, may be based on the RV of 0, allowing the retransmission to be decodable at the network node associated with the first RAN. For example, referring to FIG. 8, the network node associated with RAN1 802*a* may receive first communication 830 based on an RV of 0.

Figure 12:
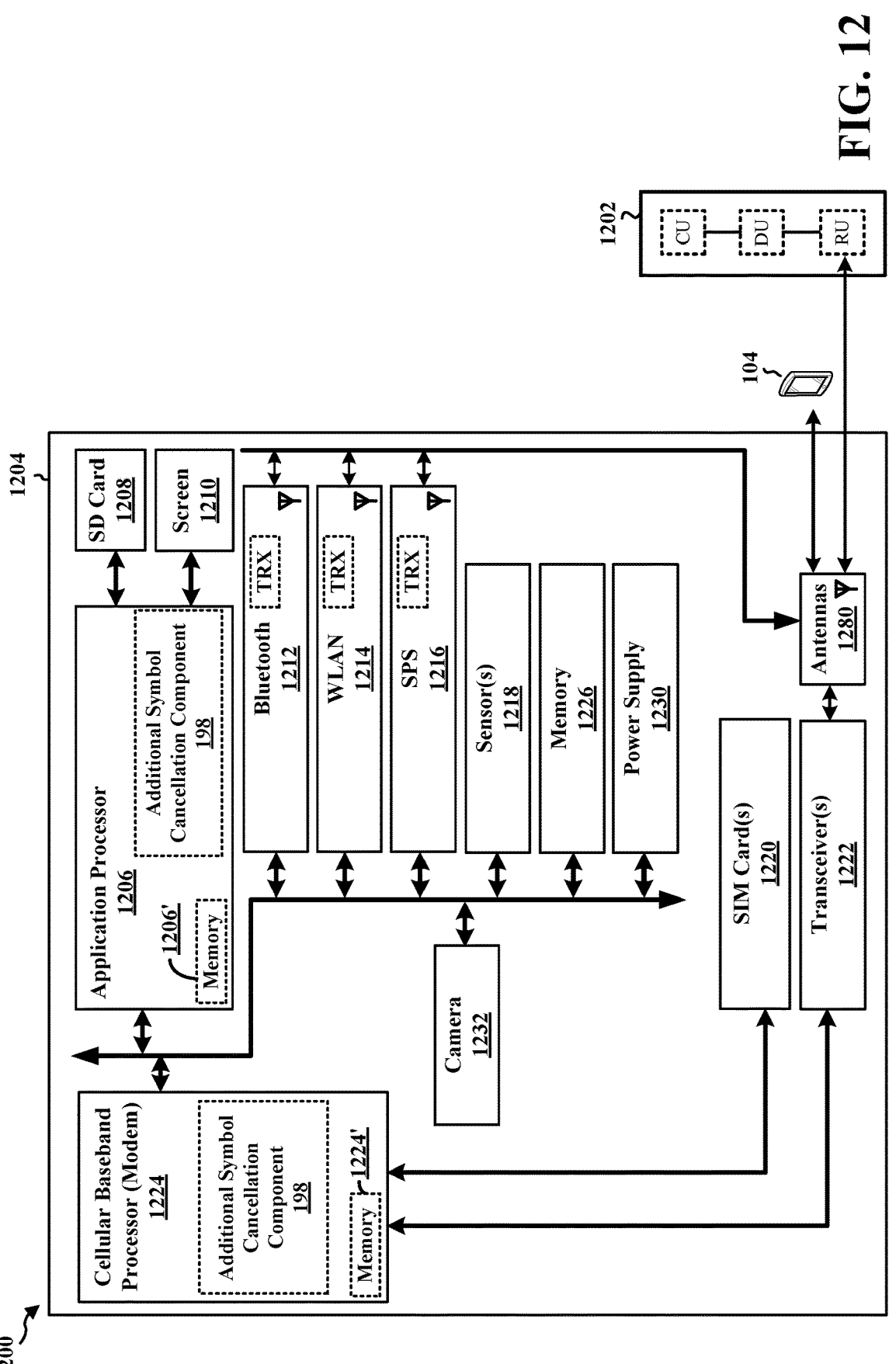
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/ memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see UE 350 of FIG. 3) and include the additional modules of the apparatus 1204.

As discussed supra, the additional symbol cancellation component 198 may be configured to configured to operate a first transceiver in a first connected mode with a RAN and a second transceiver in a second connected mode with a second RAN. The additional symbol cancellation component 198 may further be configured to transmit a first communication via the first transceiver and obtain, based on a second communication via the second transceiver, an indication of a cancellation of one or more symbols for the first communication via the first transceiver. The additional symbol cancellation component 198 may also be configured to refrain from transmitting, based on the indication, a remaining portion of the first communication via a set of symbols including the one or more symbols. The additional symbol cancellation component 198 may be within the cellular baseband processor 1224, the application processor 1206, or both the cellular baseband processor 1224 and the application processor 1206. The additional symbol cancellation component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, may include means for operating a first transceiver in a first connected mode with a first RAN and a second transceiver in a second connected mode with a second RAN. The apparatus 1204, and in particular the cellular baseband processor 1224 and/or the application processor 1206, may also include means for beginning to transmit a first communication via the first transceiver. The apparatus 1204, and in particular the cellular baseband processor 1224 and/or the application processor 1206, may also include means for obtaining, based on a second communication via the second transceiver, an indication of a cancellation of one or more symbols for the first communication via the first transceiver. The apparatus 1204, and in particular the cellular baseband processor 1224 and/or the application processor 1206, may also include means for refraining from transmitting, based on the indication, a remaining portion of the first communication via a set of symbols including the one or more symbols. The apparatus 1204, and in particular the cellular baseband processor 1224 and/or the application processor 1206, may also include means for transmitting the second communication via the one or more symbols. The apparatus 1204, and in particular the cellular baseband processor 1224 and/or the application processor 1206, may also include means for receiving, from a network node, a first grant for a first set of resources for the first communication, where the first set of resources includes the one or more symbols. The apparatus 1204, and in particular the cellular baseband processor 1224 and/or the application processor 1206, may also include means for receiving, from the network node, an additional grant for an additional set of resources for the first communication based on the wireless device refraining from transmitting the remaining portion of the first communication via the set of symbols. The apparatus 1204, and in particular the cellular baseband processor 1224 and/or the application processor 1206, may also include means for retransmitting, via the additional set of resources, the first communication after transmitting the second communication. The apparatus 1204, and in particular the cellular baseband processor 1224 and/or the application processor 1206, may also include means for obtaining, from a grant management unit of the wireless device, the indication of the cancellation of the one or more symbols. The means may be the additional symbol cancellation component 198 of the apparatus 1204 configured to perform the functions recited in relation to FIGS. 9 and 10 or by the means. As described supra, the apparatus 1204 may include the TX processor 368, the RX processor 356, and the controller/processor 359. As such, in one configuration, the means may be the TX processor 368, the RX processor 356, and/or the controller/ processor 359 configured to perform the functions recited by the means.

Figure 13:
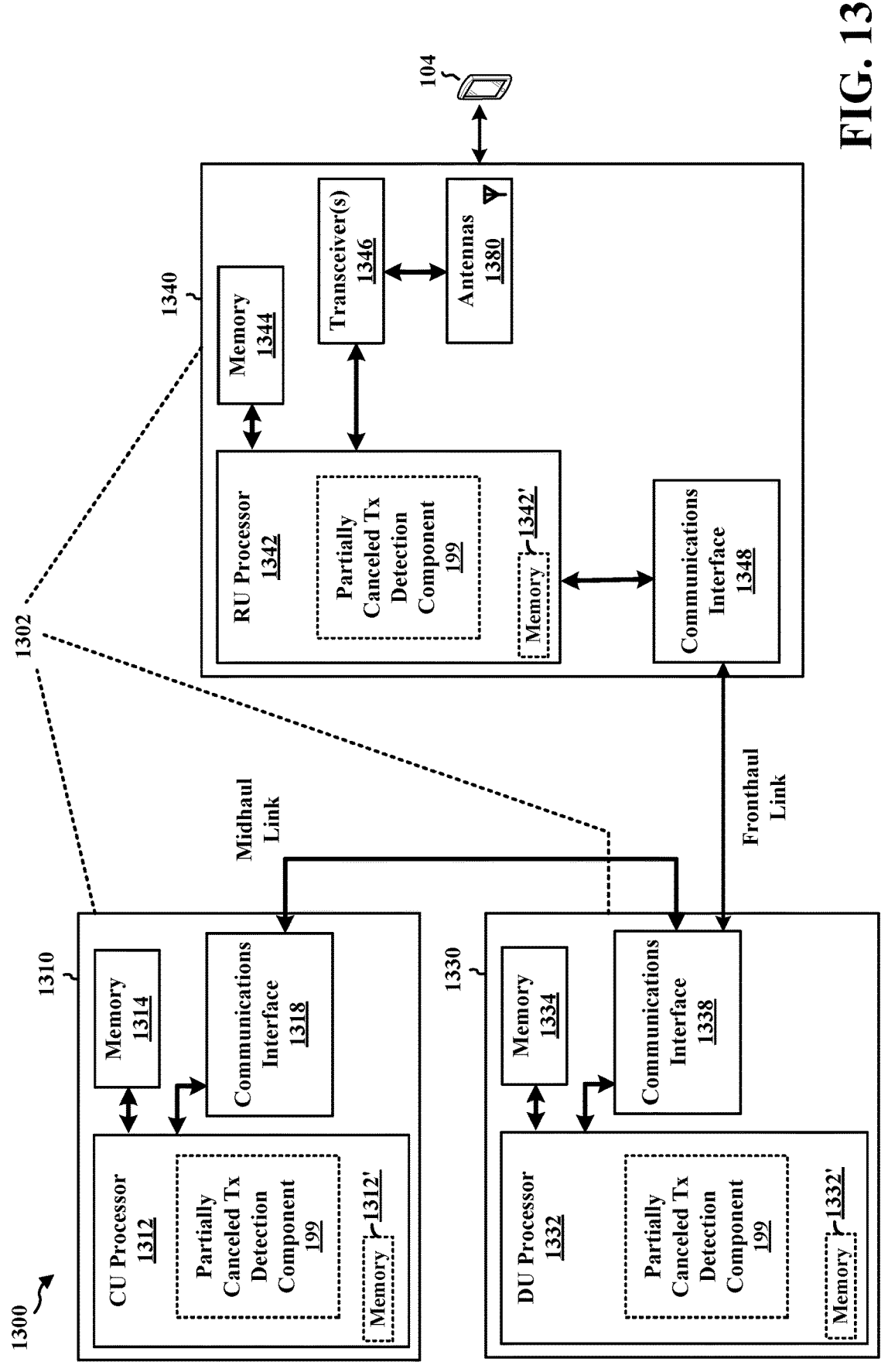
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the partially canceled Tx detection component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the partially canceled Tx detection component 199 may be configured to grant, for a wireless device, a first set of resources for a first communication associated with a first RAN. The partially canceled Tx detection component 199 may further be configured to identify, based on receiving a portion of the first communication via a subset of the first set of resources, that the first set of resources does not include the first communication and to grant, based on identifying that the first set of resources does not include the first communication, a second set of additional resources for the first communication including a redundancy value associated with an initial transmission of the first communication. The partially canceled Tx detection component 199 may be within one or more processors of one or more of the CU 1310, DU 1330, and the RU 1340. The partially canceled Tx detection component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 may include means for granting, for a wireless device, a first set of resources for a first communication associated with a first RAN. In one configuration, the network entity 1302 may include means for identifying, based on receiving a portion of the first communication via a subset of the first set of resources, that the first set of resources does not include the first communication. In one configuration, the network entity 1302 may include means for granting, based on identifying that the first set of resources does not include the first communication, a second set of additional resources for the first communication including a redundancy value associated with an initial transmission of the first communication. The means may be the partially canceled Tx detection component 199 of the network entity 1302 configured to perform the functions recited in relation to FIG. 11 or by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

In some aspects of wireless communication, e.g., DSDA, a wireless device may be connected to two different RANs. For example, a wireless device may be configured to connect to a first RAN and a second RAN simultaneously (e.g., where either the first or second RAN may be an LTE RAN or a 5G NR RAN). The different RANs may schedule overlapping transmissions from the wireless device (e.g., transmissions from the wireless device scheduled for overlapping time periods and/or for overlapping time periods and frequencies). The wireless device, in some aspects, may not be able to transmit the overlapping transmissions (at least during the overlapping time period). The inability to transmit the overlapping transmissions, in some aspects, may be due to the hardware of the wireless device being unable to transmit two different signals at a same time (e.g., having one transceiver, one antenna, etc.) or based on external limitations (e.g., a maximum allowable transmission power). Based on the inability to transmit both transmissions during the overlapping time period, the wireless device may cancel at least one transmission during the overlapping time period (e.g., may blank, zero-out data tones, or refrain from transmitting during the overlapping time period). In some aspects, the wireless device may determine to cancel a first transmission in favor of a second transmission based on a relative priority of the overlapping transmissions (e.g., based on an associated RAN, type of data or channel, or time period).

For example, in a situation where a first transmission is associated with a low-priority communication with the first RAN and the second transmission is associated with a higher-priority communication with the second RAN, the wireless device may cancel, or blank, the overlapping portion of the low-priority communication. However, in some aspects, this partial blanking may not be the optimal solution for the low-priority communication (e.g., for a communication associated with a PUSCH). For example, if the canceled, or blanked, portion of the first transmission includes at least one DMRS or DM-RS, the canceling, or blanking, may render the first transmission undecodable at a receiving network device. In some aspects, the canceling, or blanking, of the at least one DMRS in the first transmission associated with an RV of 0 may significantly corrupt and/or degrade the first transmission (e.g., the PUSCH transmission) to the extent that even a subsequent retransmission (e.g., an RV2, RV3, or RV1 retransmission using a corresponding RV of 2, 3, or 1, respectively) may not be decodable. Accordingly, a method and apparatus is provided to detect an overlapping transmission that may lead to canceling or blanking one DMRS of a first transmission of a first communication and to cancel additional portions (e.g., symbols) of the first transmission to cause a receiving network device to fail to identify or detect the first transmission and to use an RV of 0 for a subsequent grant for a (re)transmission of the first communication.

Particular aspects of the subject matter described in this disclosure can be implemented to realize one or more of the following potential advantages. In some examples, by canceling additional symbols beyond a minimal set of (overlapping) symbols for transmitting the second transmission, the described techniques can be used to avoid one or more retransmissions of a non-decodable first transmission (or communication) where the retransmissions may also not be decodable.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including operating a first transceiver in a first connected mode with a first RAN and a second transceiver in a second connected mode with a second RAN, initiating a transmission of a first communication via the first transceiver, obtaining, based on a second communication via the second transceiver, an indication of a cancellation of a set of symbols for the first communication via the first transceiver, and refraining from transmitting, based on the indication, a remaining portion of the first communication via the set of symbols, where the set of symbols comprises one or more symbols that at least partially overlap with the second communication.

Aspect 2 is the method of aspect 1, where the set of symbols includes one or more additional symbols of the remaining portion of the first communication, where the one or more additional symbols includes at least one symbol that precedes the one or more symbols, and where obtaining the indication is based on the one or more symbols meeting a set of criteria.

Aspect 3 is the method of any of aspects 1 and 2, further including receiving, from a second network node, a second grant for a second set of resources for the second communication, where the second set of resources at least partially overlaps with the one or more symbols but not the one or more additional symbols, and transmitting the second communication via the one or more symbols.

Aspect 4 is the method of any of aspects 1 to 3, where obtaining the indication is based on the one or more symbols including a symbol for a reference signal associated with the first communication.

Aspect 5 is the method of any of aspects 1 to 4, where obtaining the indication is based on the one or more symbols including at least a threshold number of symbols.

Aspect 6 is the method of aspect 5, where the threshold number of symbols is based on one of a numerology or MCS associated with the first communication.

Aspect 7 is the method of any of aspects 1 to 6, where obtaining the indication is based on at least one of a SNR, a SINR, or a CQI associated with the first communication.

Aspect 8 is the method of any of aspects 1 to 7, where obtaining the indication is based on a BLER associated with the first communication.

Aspect 9 is the method of any of aspects 1 to 8, where obtaining the indication is based on the first communication being associated with a PUSCH.

Aspect 10 is the method of any of aspects 1 to 9, where the indication is based on one or more of an inability of the wireless device to simultaneously transmit the first communication and the second communication, or a power associated with simultaneously transmitting the first communication and the second communication exceeding a threshold power.

Aspect 11 is the method of any of aspects 1 to 10, where the indication is further based on a relative priority for communications associated with the first transceiver and the second transceiver.

Aspect 12 is the method of aspect 11, where the relative priority is a locally-assigned priority independent of a priority associated with a particular communication, where the first communication is a first communication type associated with a first priority of the relative priority and the second communication is a second communication type associated with a second priority of the relative priority, and where refraining from communicating via the one or more symbols is further based on the first communication type and the second communication type.

Aspect 13 is the method of any of aspects 1 to 12, where obtaining the indication of the cancellation includes obtaining, from a grant management unit of the wireless device, the indication of the cancellation of the one or more symbols.

Aspect 14 is the method of any of aspects 1 to 13, where the wireless device is a user equipment (UE) and the first communication is with a network node, the method further including receiving, from the network node, a first grant for a first set of resources for the first communication, where the first set of resources includes the one or more symbols, receiving, from the network node, an additional grant for an additional set of resources for the first communication based on the wireless device refraining from transmitting the remaining portion of the first communication via the set of symbols, where the additional grant for the additional set of resources for the first communication indicates a redundancy value associated with an initial transmission, and retransmitting, via the additional set of resources, the first communication after transmitting the second communication.

Aspect 15 is a method of wireless communication at a network node, including granting, for a wireless device, a first set of resources for a first communication associated with a first RAN, identifying, based on receiving a portion of the first communication via a subset of the first set of resources, that the first set of resources does not include the first communication, and granting, based on identifying that the first set of resources does not include the first communication, a second set of additional resources for the first communication including a redundancy value associated with an initial transmission of the first communication.

Aspect 16 is the method of aspect 1, where granting the first set of resources for the first communication includes transmitting, for the wireless device, a first grant for the first set of resources for the first communication, and where granting the second set of additional resources for the first communication includes transmitting, for the wireless device, a second grant for the second set of additional resources for the first communication.

Aspect 17 is the method of any of aspects 15 and 16, where the wireless device is a UE and the network node is a base station.

Aspect 18 is an apparatus for wireless communication at a device including a memory and at least one processor coupled to the memory and, based at least in part on information stored in the memory, the at least one processor is configured to implement any of aspects 1 to 17.

Aspect 19 is the method of aspect 18, further including a transceiver or an antenna coupled to the at least one processor.

Aspect 20 is an apparatus for wireless communication at a device including means for implementing any of aspects 1 to 17.

Aspect 21 is a computer-readable medium (e.g., a non-transitory computer-readable medium) storing computer executable code, where the code when executed by a processor causes the processor to implement any of aspects 1 to 17.

What is claimed is:

1. An apparatus for wireless communication at a wireless device, comprising:

memory; and at least one processor coupled to the memory and, based at least in part on information stored in the memory, the at least one processor is configured to:

operate a first transceiver in a first connected mode with a first radio access network (RAN) and a second transceiver in a second connected mode with a second RAN;

receive a first grant for a first set of resources over a set of symbols for a first communication associated with the first RAN;

receive a second grant for a second set of resources for a second communication associated with the second RAN, wherein the set of symbols for the first communication comprises 1) one or more symbols that at least partially overlap with the second communication; and 2) a remaining portion of the first communication; and refrain from transmitting the remaining portion of the first communication based at least on whether the one or more symbols comprise one or more demodulation reference signal (DMRS) symbols.

2. The apparatus of claim 1, wherein the remaining portion of the first communication is not transmitted based at least on the one or more symbols comprising at least one DMRS symbol; and wherein the remaining portion of the first communication is transmitted based at least on the one or more symbols not comprising any DMRS symbol.

3. The apparatus of claim 1, wherein the at least one processor is further configured to:

transmit the second communication via the one or more symbols.

4. The apparatus of claim 1, wherein the at least one processor is further configured to obtain an indication indicating cancelation of the one or more symbols.

5. The apparatus of claim 1, wherein to refrain from transmitting the remaining portion is further based on the one or more symbols comprising at least a threshold number of symbols.

6. The apparatus of claim 5, wherein the threshold number of symbols is based on one of a numerology or modulation and coding scheme (MCS) associated with the first communication.

7. The apparatus of claim 1, wherein to refrain from transmitting the remaining portion is further based on at least one of a signal-to-noise ratio (SNR), a signal-to-interference plus noise ratio (SINR), or a channel quality indicator (CQI) associated with the first communication.

8. The apparatus of claim 1, wherein the first grant includes a first redundancy value corresponding to initial transmissions.

9. The apparatus of claim 1, wherein the first communication comprises a physical uplink shared channel (PUSCH).

10. The apparatus of claim 1, wherein to refrain from transmitting the remaining portion is further based on a relative priority for communications associated with the first transceiver and the second transceiver.

11. The apparatus of claim 10, wherein the relative priority is a locally-assigned priority independent of a priority associated with a particular communication, wherein the first communication is a first communication type associated with a first priority of the relative priority and the second communication is a second communication type associated with a second priority of the relative priority, and wherein the at least one processor is further configured to refrain from communicating via the one or more symbols based on the first communication type and the second communication type.

12. The apparatus of claim 1, wherein the wireless device is a user equipment (UE) and the first communication is with a network node, wherein the at least one processor is further configured to:

receive a subsequent grant to retransmit the first communication with a first redundancy value corresponding to initial transmissions.

13. An apparatus for wireless communication at a network node, comprising:

memory; and at least one processor coupled to the memory and, based at least in part on information stored in the memory, the at least one processor is configured to:

grant, for a wireless device, a first set of resources for a first communication associated with a first radio access network (RAN);

identify, based on receiving a portion of the first communication via a subset of the first set of resources, that the first set of resources does not include the first communication; and grant, based on identifying that the first set of resources does not include the first communication, a second set of additional resources for the first communication including a redundancy value associated with an initial transmission of the first communication.

14. The apparatus of claim 13, wherein:

to grant the first set of resources for the first communication, the at least one processor is configured to transmit, for the wireless device, a first grant for the first set of resources for the first communication; and to grant the second set of additional resources for the first communication, the at least one processor is configured to transmit, for the wireless device, a second grant for the second set of additional resources for the first communication.

15. The apparatus of claim 13, wherein the wireless device is a user equipment (UE) and the network node is a base station.

16. A method of wireless communication at a wireless device, comprising:

operating a first transceiver in a first connected mode with a first radio access network (RAN) and a second transceiver in a second connected mode with a second RAN;

receiving a first grant for a first set of resources over a set of symbols for a first communication associated with the first RAN;

receiving a second grant for a second set of resources for a second communication associated with the second RAN, wherein the set of symbols for the first communication comprises 1) one or more symbols that at least partially overlap with the second communication; and 2) a remaining portion of the first communication; and refraining from transmitting the remaining portion of the first communication based at least on whether the one or more symbols comprise one or more demodulation reference signal (DMRS) symbols.

17. The method of claim 16, wherein the remaining portion of the first communication is not transmitted based at least on the one or more symbols comprising at least one DMRS symbol; and wherein the remaining portion of the first communication is transmitted based at least on the one or more symbols not comprising any DMRS symbol.

18. The method of claim 16, wherein the wireless device is a user equipment (UE) and the first communication is with a network node, the method further comprising:

transmitting the second communication via the one or more symbols; and receiving a subsequent grant to retransmit the first communication with a first redundancy value corresponding to initial transmissions.

19. The method of claim 16, further comprising obtaining an indication indicating cancelation of the one or more symbols.

20. The method of claim 16, wherein refraining from transmitting the remaining portion is further based on the one or more symbols comprising at least a threshold number of symbols.

21. The method of claim 20, wherein the threshold number of symbols is based on one of a numerology or modulation and coding scheme (MCS) associated with the first communication.

22. The method of claim 16, wherein refraining from transmitting the remaining portion is further based on at least one of a signal-to-noise ratio (SNR), a signal-to-interference plus noise ratio (SINR), or a channel quality indicator (CQI), and wherein the first grant includes a first redundancy value corresponding to initial transmissions.

23. The method of claim 16, wherein the first communication comprises a physical uplink shared channel (PUSCH).

24. The method of claim 16, wherein to refrain from transmitting the remaining portion is further based on a relative priority for communications associated with the first transceiver and the second transceiver, and wherein the relative priority is a locally-assigned priority independent of a priority associated with a particular communication, wherein the first communication is a first communication type associated with a first priority of the relative priority and the second communication is a second communication type associated with a second priority of the relative priority, and wherein refraining from communicating via the one or more symbols is further based on the first communication type and the second communication type.

25. A method of wireless communication at a network node, comprising:

granting, for a wireless device, a first set of resources for a first communication associated with a first radio access network (RAN);

identifying, based on receiving a portion of the first communication via a subset of the first set of resources, that the first set of resources does not include the first communication; and granting, based on identifying that the first set of resources does not include the first communication, a second set of additional resources for the first communication including a redundancy value associated with an initial transmission of the first communication.

26. The method of claim 25, wherein the wireless device is a user equipment (UE) and the network node is a base station, wherein granting the first set of resources for the first communication comprises transmitting, for the wireless device, a first grant for the first set of resources for the first communication; and wherein granting the second set of additional resources for the first communication comprises transmitting, for the wireless device, a second grant for the second set of additional resources for the first communication.

* * * * *